(12) United States Patent
Littlefield

(10) Patent No.: US 11,885,447 B2
(45) Date of Patent: Jan. 30, 2024

(54) PIPE COUPLING AND ANCHORING SYSTEM

(71) Applicant: IPEX TECHNOLOGIES INC., Oakville (CA)

(72) Inventor: Jeffrey Vincent Littlefield, Brantford (CA)

(73) Assignee: IPEX TECHNOLOGIES INC., Mississauga (CA)

( * ) Notice: Subject to any disclaimer, the term of this patent is extended or adjusted under 35 U.S.C. 154(b) by 15 days.

(21) Appl. No.: 17/702,183

(22) Filed: Mar. 23, 2022

(65) Prior Publication Data
US 2023/0304606 A1    Sep. 28, 2023

(30) Foreign Application Priority Data
Mar. 25, 2021    (CA) ................................ CA 3113312

(51) Int. Cl.
*F16L 3/10* (2006.01)
*F16L 21/06* (2006.01)

(52) U.S. Cl.
CPC ........... *F16L 3/1091* (2013.01); *F16L 21/065* (2013.01)

(58) Field of Classification Search
CPC ..... E04B 2001/2692; E04B 2001/2668; E04B 9/18; E04B 1/585; E04B 1/98; F16B 2/20;
(Continued)

(56) References Cited

U.S. PATENT DOCUMENTS

| 119,127 A | 9/1871 | Demarest |
| 1,813,528 A | 7/1931 | Clark |

(Continued)

FOREIGN PATENT DOCUMENTS

| EP | 221641491 | 6/2022 |
| JP | 2000 204616 | 7/2000 |

(Continued)

OTHER PUBLICATIONS

Translation JP 2004-270166 (Year: 2004).*

*Primary Examiner* — Aaron M Dunwoody

(57) ABSTRACT

A coupling and anchoring system for coupling lengths of pipe and anchoring the lengths of pipe to a structure comprise a pipe coupling having an external peripheral groove defined by axially facing axial clamp engaging surfaces, said groove receiving an anchoring clamp. The anchoring clamp has corresponding axial coupling engaging surfaces for engaging the axial clamp engaging surfaces of the pipe coupling to restrict axial movement of the pipe coupling when the anchoring clamp is fastened to the structure. The anchoring clamp is formed from arced bands having laterally extending connecting portions and laterally extending arced elements. The laterally extending connecting surfaces and arcs combine to form dual fastener openings for optionally receiving fastening elements perpendicular and parallel to the longitudinal axis of the pipe coupling for optionally anchoring the system to perpendicular and parallel portions of the structure. The internal arc radius of the arced bands is comparable to the outer diameter of the external peripheral groove with the laterally extending connecting portions radially remote from the groove so that connection of the laterally extending portions prevents over tightening of the clamp. The coupling has an hour-glass cross section with the peripheral groove located axially interposed between the pipe stops and the clamp engaging surfaces such that the pipe lengths would not be axially coincident with the external groove.

26 Claims, 15 Drawing Sheets

(58) Field of Classification Search
CPC ...... F16B 252/848; F16B 2/02; F16B 52/848; E04H 9/021; E04F 17/08; F16L 3/137; F16L 3/233; F16L 3/1091; F16L 3/10; F16L 3/1008; F16L 41/00; F16L 41/001; F16L 25/04; F16L 25/12; F16L 21/065; Y10T 403/7182; Y10T 285/24; Y10T 285/27; Y10T 285/28
See application file for complete search history.

(56) References Cited

U.S. PATENT DOCUMENTS

| | | | |
|---|---|---|---|
| 1,868,217 A | 7/1932 | Mueller | |
| 1,926,752 A | 9/1933 | Mueller | |
| 1,936,852 A | 11/1933 | Mueller | |
| 2,089,940 A | 8/1937 | Brown | |
| 3,194,590 A | 7/1965 | Cook | |
| 9,780,548 B1 * | 10/2017 | Kranz | F16L 3/1075 |
| 2003/0183733 A1 * | 10/2003 | Pisczak | H02G 7/053 248/229.23 |

FOREIGN PATENT DOCUMENTS

| | | |
|---|---|---|
| JP | 2004 270166 | 9/2004 |
| KR | 1989-0000340 | 3/1989 |
| KR | 2018 0123824 | 11/2018 |

* cited by examiner

PIPE COUPLING AND ANCHORING SYSTEM

FIELD OF THE INVENTION

This invention relates to a system and kit to couple together a first length of pipe and a second length of pipe while anchoring the coupled lengths of pipe to a structure. More particularly, the present invention relates to a coupling and anchoring system and kit for use in coupling lengths of pipes together, such as a pipe riser in a building, and anchoring the lengths of pipe to a physical structure, such as a part of the building.

BACKGROUND OF THE INVENTION

In the past, there have been many different types of systems and devices to secure or anchor lengths of pipe, and in particular pipe risers in high rise building applications, to structures. However, occasionally, the clamps are not correctly anchored to the building or other physical structure. In this way, over time, movement of the riser, such as caused by linear expansion and contraction of the piping system, may cause, or contribute to, joint failures in the piping systems.

Generally, expansion and contraction of pipe systems can occur over time and, in particular, in response to thermal expansion. If clamps and risers are not correctly anchored to the building, the clamps and risers can lift off from the portion of the building, such as a concrete slab in some building applications. This can arise, for example, with the axial thermal expansion of the riser, thereby defeating the purpose of having a clamp.

Furthermore, many prior art clamps lack control over how tight to make the clamp on the pipe. For instance, if installers over tighten the clamp, the pipe being clamped could be deformed or damaged. Similarly, if installers under tighten the clamp, the clamp may not be able to support the weight of the pipe. Therefore, a lack of control over how tight to make a clamp on a pipe may have created potential difficulties in past installations.

Furthermore, it is not always clear where a pipe may be anchored to a structure, such as a building. This is the case in part because it is not clear what other elements may be near the clamp and pipe which during installation could prevent anchoring of the pipe. This problem is potentially compounded with buildings having more glass exterior walls.

Accordingly, there is a need in the art to anchor lengths of pipe, in particular pipe risers in high rise building applications, to a structure, such as a portion of the building, to limit movement of the pipe such as, but not limited to, axial linear movement caused by thermal expansion. Furthermore, there is a need in the art to tighten clamps to lengths of pipe to support the weight of the pipe, while decreasing or guarding against damage or deformation to the underlying pipe. There is also a need in the art for a robust system which increases versatility during anchoring of pipes, such as in building applications, to accommodate other elements near the pipe or clamp.

SUMMARY OF THE INVENTION

Accordingly, it is an object of this invention to at least partially overcome some of the disadvantages of the prior art. Also, it is an object of at least some embodiments of the invention to provide an improved type of pipe coupling and anchoring system to facilitate anchoring of a length of pipe, such as a pipe riser in a building, to a physical structure. It is also an object of at least some embodiments of the invention to provide an improved type of pipe coupling and anchoring system which can decrease or guard against damage to the pipes during tightening.

Accordingly, in one of its aspects, this invention resides in a coupling and anchoring system for fluidly coupling a first length of pipe to a second length of pipe and anchoring the lengths of pipe to a structure, said coupling and anchoring system comprising: a pipe coupling extending along a coupling longitudinal axis and having a first pipe opening for receiving the first length of pipe along the coupling longitudinal axis and a second pipe opening for receiving the second length of pipe, said pipe coupling having an external peripheral groove located axially intermediate the first pipe opening and the second pipe opening, said external peripheral groove defined by a first axial clamp engaging surface which axially faces a second axial clamp engaging surface with the external peripheral groove formed therebetween; an anchoring clamp for fastening to the structure, said anchoring clamp having a first axial coupling engaging surface which is axially opposed from a second axial coupling engaging surface, wherein the anchoring clamp is axially sized to be received by the external peripheral groove with the first axial coupling engaging surface of the anchoring clamp engaging the first axial clamp engaging surface of the pipe coupling, and the second axial coupling engaging surface of the anchoring clamp engaging the second axial clamp engaging surface of the pipe coupling to restrict axial movement of the pipe coupling when the anchoring clamp is fastened to the structure.

In a further aspect, the present invention resides in a kit for fluidly coupling a first length of pipe to a second length of pipe and anchoring the lengths of pipe to a structure, the kit comprising: a pipe coupling extending along a coupling longitudinal axis and having a first pipe opening for receiving the first length of pipe along the coupling longitudinal axis and a second pipe opening for receiving the second length of pipe, said pipe coupling having an external peripheral groove located axially intermediate the first pipe opening and the second pipe opening, said external peripheral groove defined by a first axial clamp engaging surface which axially faces a second axial clamp engaging surface with the external peripheral groove formed therebetween; an anchoring clamp assembly comprising: two or more arced bands, each arced band having a central arc portion interposed between laterally extending connecting portions, said laterally extending connecting portions overlapping with laterally extending connecting portions of adjacent arced bands to connect adjacent arced bands together to assemble the anchoring clamp about the external peripheral groove of the pipe coupling wherein each central arc portion forming an arc segment of the anchoring clamp when the anchoring clamp is assembled about the external peripheral groove; and wherein assembly of the anchoring clamp in the external peripheral groove provides a first axial coupling engaging surface of the anchoring clamp which is axially opposed from a second axial coupling engaging surface, wherein the anchoring clamp so assembled is axially sized to be received by the external peripheral groove with the first axial coupling engaging surface of the anchoring clamp engaging the first axial clamp engaging surface of the pipe coupling, and the second axial coupling engaging surface of the anchoring clamp engaging the second axial clamp engaging surface of the pipe coupling to restrict axial movement of the pipe coupling when the anchoring clamp is fastened to the structure.

Accordingly, in at least one of its aspects, the present invention provides a combination of a pipe coupling and an anchoring clamp. In this way, the total number of joints required for the connection may potentially be reduced at least because the pipe coupling and anchoring clamp work together to both couple and anchor the pipe lengths. This facilitates installation of the lengths of pipe, particularly in the case where the lengths of pipe relate to a pipe riser which would extend through several floors in a high rise building application. Furthermore, this could decrease costs associated with installing the entire piping system.

An advantage of at least some aspects of the present invention relates to the engagement of the first and second axial clamp engaging surfaces of the pipe coupling and the first and second axial coupling engagement surface of the anchoring clamp. By this axial engagement of the surfaces, the potential axial movement of the pipe coupling, and therefore the lengths of pipe which may be coupled therein, may be restricted when the anchoring clamp is correctly fastened to the structure.

A further advantage of at least some aspects of the present invention also relate to the anchoring clamp being formed of adjacent arced bands which together may be connected through opposed laterally extending side walls to essentially be assembled around the peripheral groove of the pipe coupling. In this way, the anchoring clamp can be formed or assembled around the pipe coupling after the pipe coupling has been coupled to first and second lengths of pipe, such as during installation or construction of a high rise building. In a further preferred aspect, the anchoring clamp comprises two arced bands, each extending for about 180°, with laterally extending connecting portions which can be connected together. In this way, the anchoring clamp may be formed of two substantially identical components, each extending for about 180° about the peripheral groove, thereby decreasing the number of components and complexity of the anchoring clamp. This has a corresponding decrease in the cost to manufacture and an increase in the ease of use as effectively the two identical components can be connected together to form the anchoring clamp about the peripheral groove. Furthermore, each arc band may be formed from a single strip of metal which also potentially decreases manufacturing costs.

In a further preferred embodiment, the anchoring clamp has dual fastening openings for optionally receiving fastening elements, either perpendicular to the longitudinal axis of the pipe coupling, or, parallel to the longitudinal axis of the pipe coupling. This improves the versatility and ease of anchoring the anchoring clamp by permitting the anchoring clamp to be clamped either to a structure that is perpendicular to the longitudinal axis of the pipe coupling or parallel to the longitudinal axis of the pipe coupling. This can be particularly useful in several applications, such as high rise building applications, as it is not always certain to what portion of the building structure the pipe riser could be anchored as there may be other types of components present in and around the vicinity of the pipe riser which could limit anchoring options. It is also not always clear if the pipe riser is to be anchored to a vertical wall of a building or a horizontal surface, such as a concrete slab floor. This is the case, for example, where a vertical wall may not be near the anchoring clamp during installation. In a further preferred embodiment, the anchoring clamp can be anchored both to a perpendicular surface, such as a horizontal slab floor, and, a parallel surface, such as a vertical wall of the building, to provide further anchoring and security of the pipe to the structure.

A further advantage of at least one aspect of the invention is that the arced bands may comprise laterally extending arced elements which face each other when the arced bands are assembled about the peripheral groove to form the anchoring clamp. In one preferred embodiment, the laterally extending arced elements form a channel extending in the longitudinal direction and laterally offset from the central arc portion of the anchoring clamp when the anchoring clamp is assembled about the pipe coupling with the formed axial channel defining one of the openings of the dual fastening openings. This decreases the number of components of the anchor clamp as the dual fastening openings are formed when the anchor clamp is assembled. Furthermore, the formed channels extend substantially longitudinally and are radially offset from the longitudinal axis of the pipe coupling such that the openings to the channels permit anchoring of the clamp to a surface which is perpendicular to the longitudinal direction of the pipe coupling and, therefore, the pipe.

An advantage of a further aspect of the present invention is that the arced bands define an internal arc which has an internal arc radius comparable to an outer diameter of the external peripheral groove of the pipe coupling. In this way, assembly of the arced bands within the groove is performed by attaching the lateral extending connecting portions of adjacent arced bands. Because of this, over tightening of the lateral extending connecting portions of adjacent arced bands would not necessarily cause a decrease in the internal arc radius of the arced bands of the assembled anchoring clamp thereby substantially guarding against and/or avoiding over tightening of the arced clamp. This decreases the likelihood of the pipe coupling being damaged by over tightening of the arced bands and may give the installer additional latitude or control over the installation procedure. Furthermore, this added latitude and control also avoids under tightening as the installer may adequately tighten the lateral extending portions together without concern that the internal arc radius of the arc bands would necessarily decrease, which could cause damage to the pipe coupling and/or pipes.

A further advantage of at least some aspects of the invention is that the external peripheral groove of the pipe coupling is axially separated from the lengths of pipe when the lengths of pipe have been inserted into the pipe coupling. In a further aspect, the pipe coupling has effectively an "hourglass" shape with the first opening and second opening having larger internal and external diameters for receiving and first length of pipe and second length of pipe, and first and second pipe stops for contacting the first and second lengths of pipe when they are in an inserted position. The axial locations of the first and second pipe stops are preferably interposed between the axial locations of the first axial clamp engaging surface and the second axial clamp engaging surface of the pipe coupling defining the external peripheral groove. In this way, potential over tightening of the arced bands, or the anchoring clamp, would not necessarily damage the pipes received in the pipe coupling because the pipe lengths would not necessarily be axially coincident with the external peripheral groove and the anchoring clamp and, therefore, would not necessarily be susceptible to internal radial forces caused by potential over tightening of the anchoring clamp. In a further preferred embodiment, the internal diameter of the pipe coupling between the first and second pipe stops is preferably consistent with the internal diameter of the first and second lengths of pipe being coupled such that the hour-glass cross section of the pipe coupling may potentially decrease fluid flow friction in the pipe riser during use.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Preferred embodiments of the invention and its advantages can be understood by referring to the present drawings. In the present drawings, like numerals are used for like and corresponding parts of the accompanying drawings.

Figure 1:
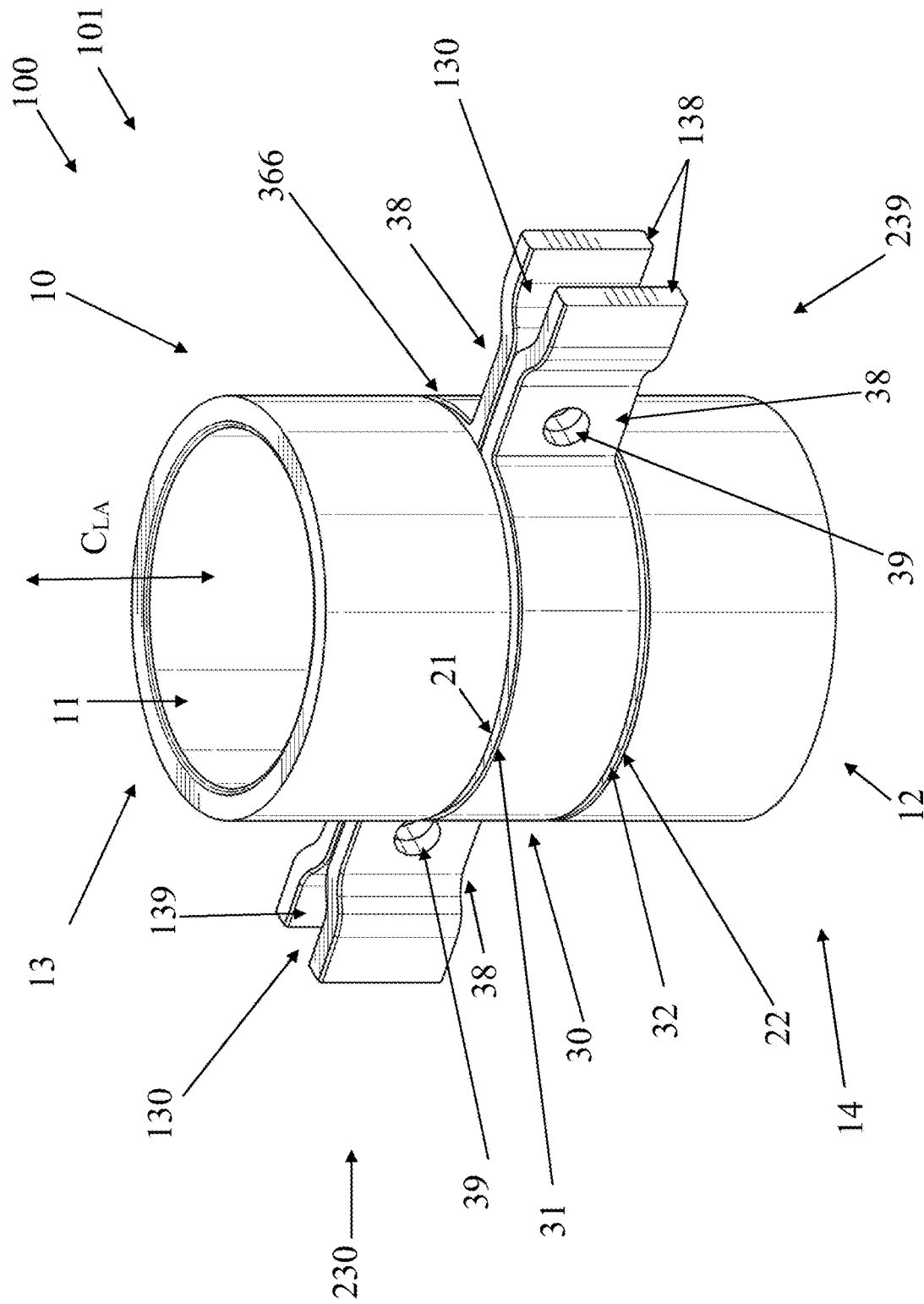
FIG. 1 illustrates a side front perspective view of the coupling and anchoring system according to one preferred embodiment showing the anchoring clamp received by the external peripheral groove of the pipe coupling according to one preferred embodiment of the present invention.
Figure 2:
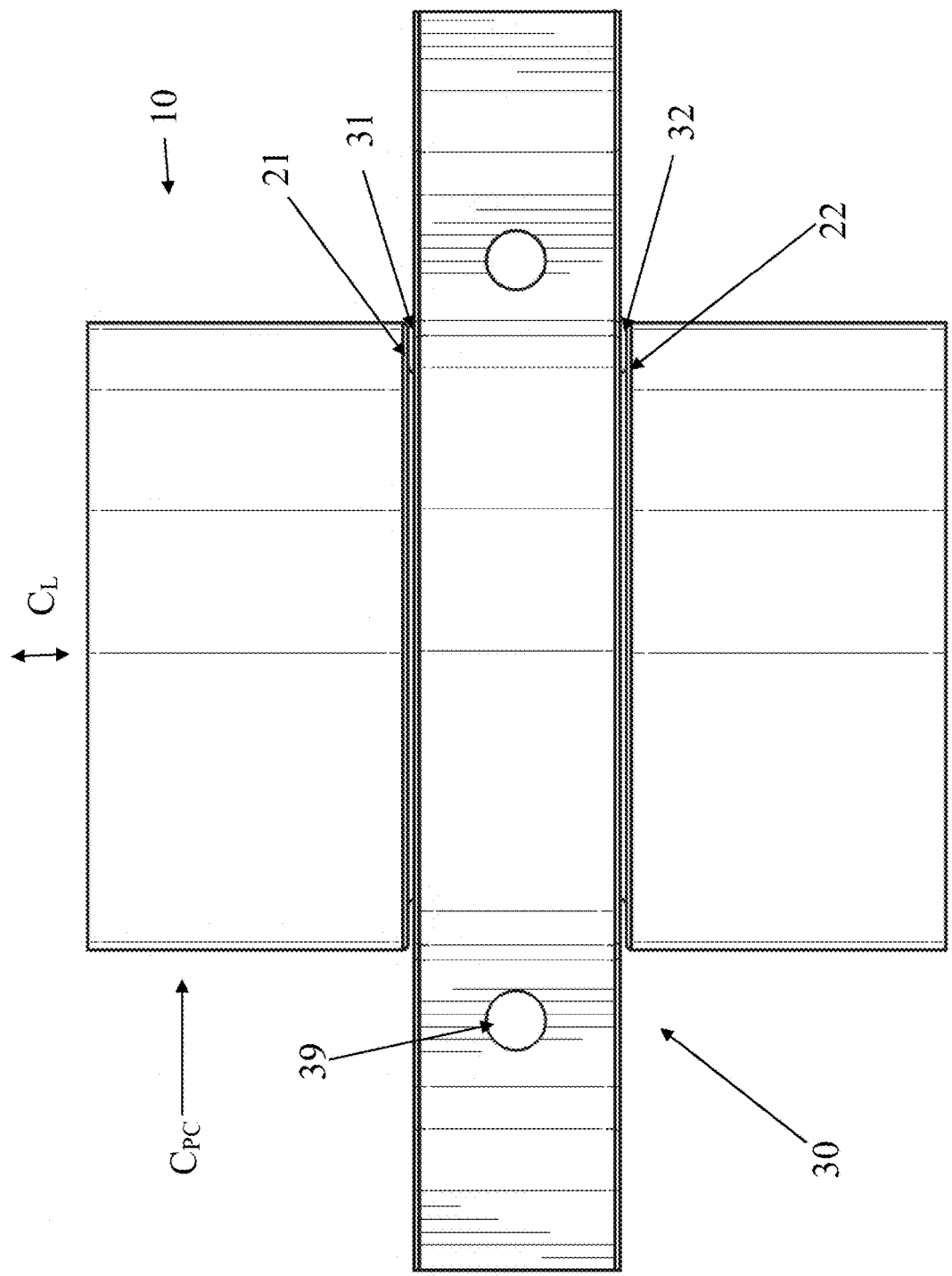
FIG. 2 is a front elevational view of the coupling and anchoring system shown in FIG. 1.
Figure 3:
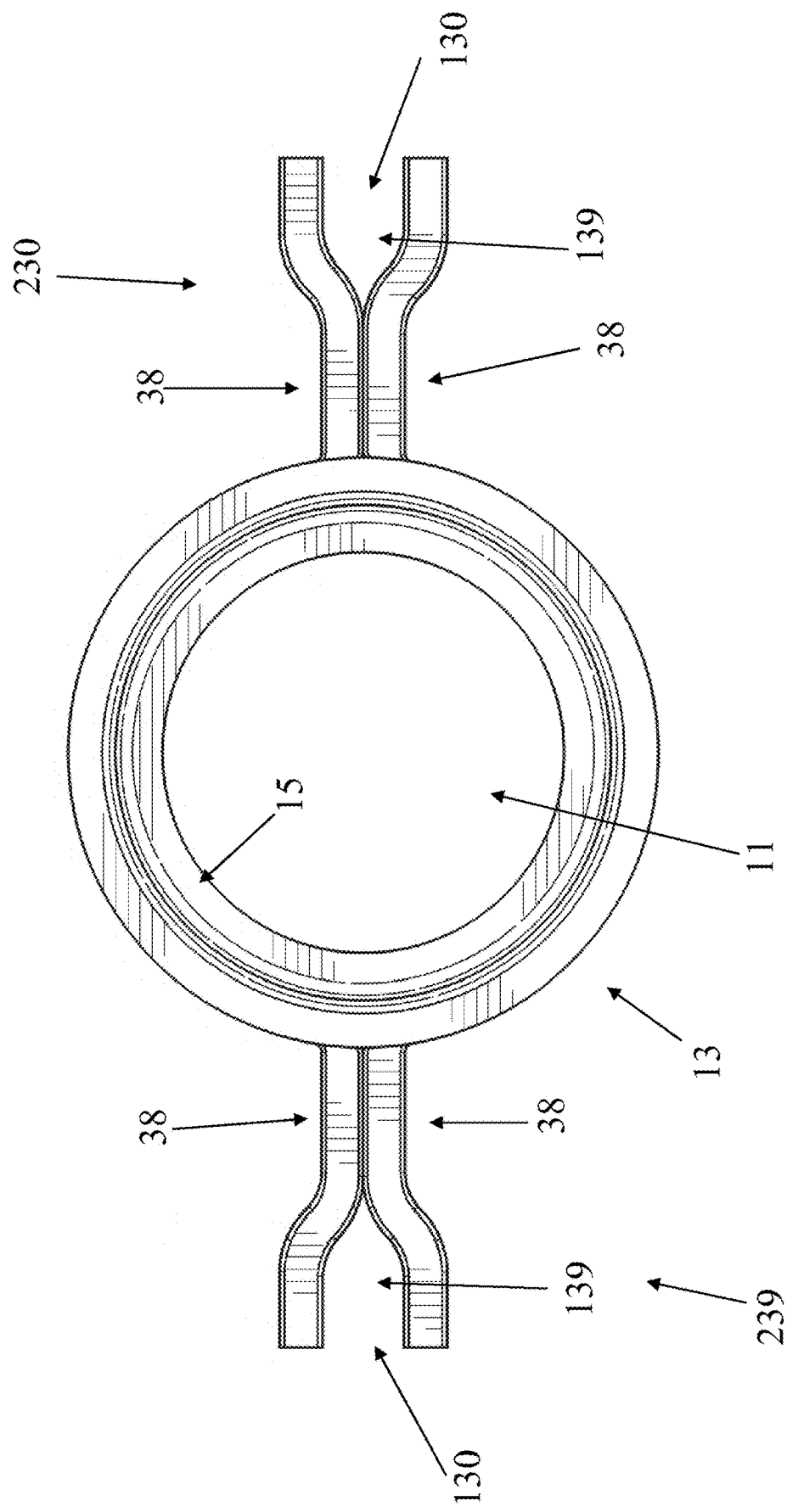
FIG. 3 is a top planned view of the coupling and anchoring system shown in FIG. 1.
Figure 4:
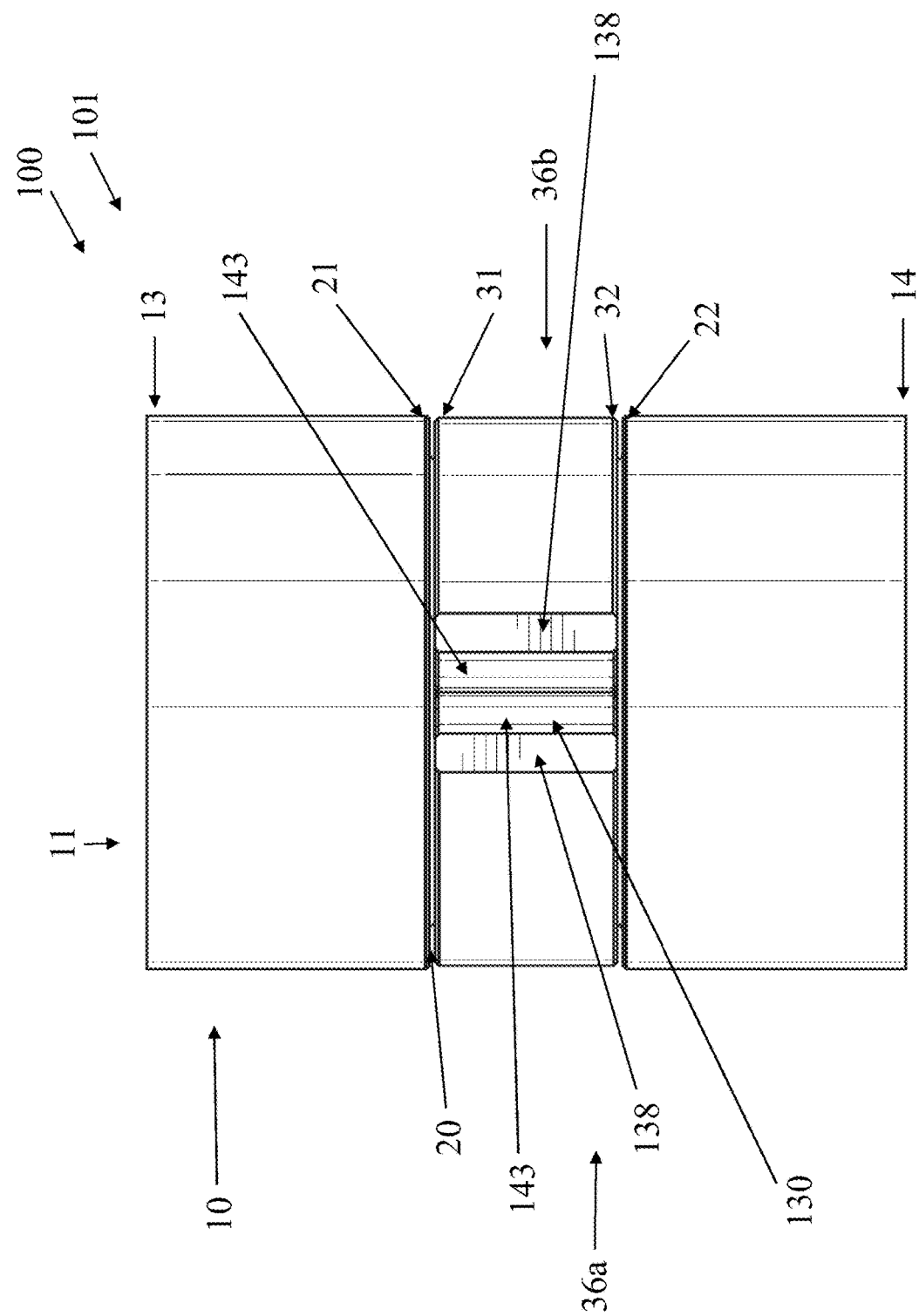
FIG. 4 is a side view of the coupling and anchoring system shown in FIG. 1.

As shown in FIG. 1, one embodiment of the present invention relates to a coupling and anchoring system, shown generally by reference numeral 100. The coupling and anchoring system 100 may be in the form of a kit, shown generally by reference numeral 101. Reference to a system 100 in this description will be understood to also relate to the kit 101 for forming the system 100.

Figure 5:
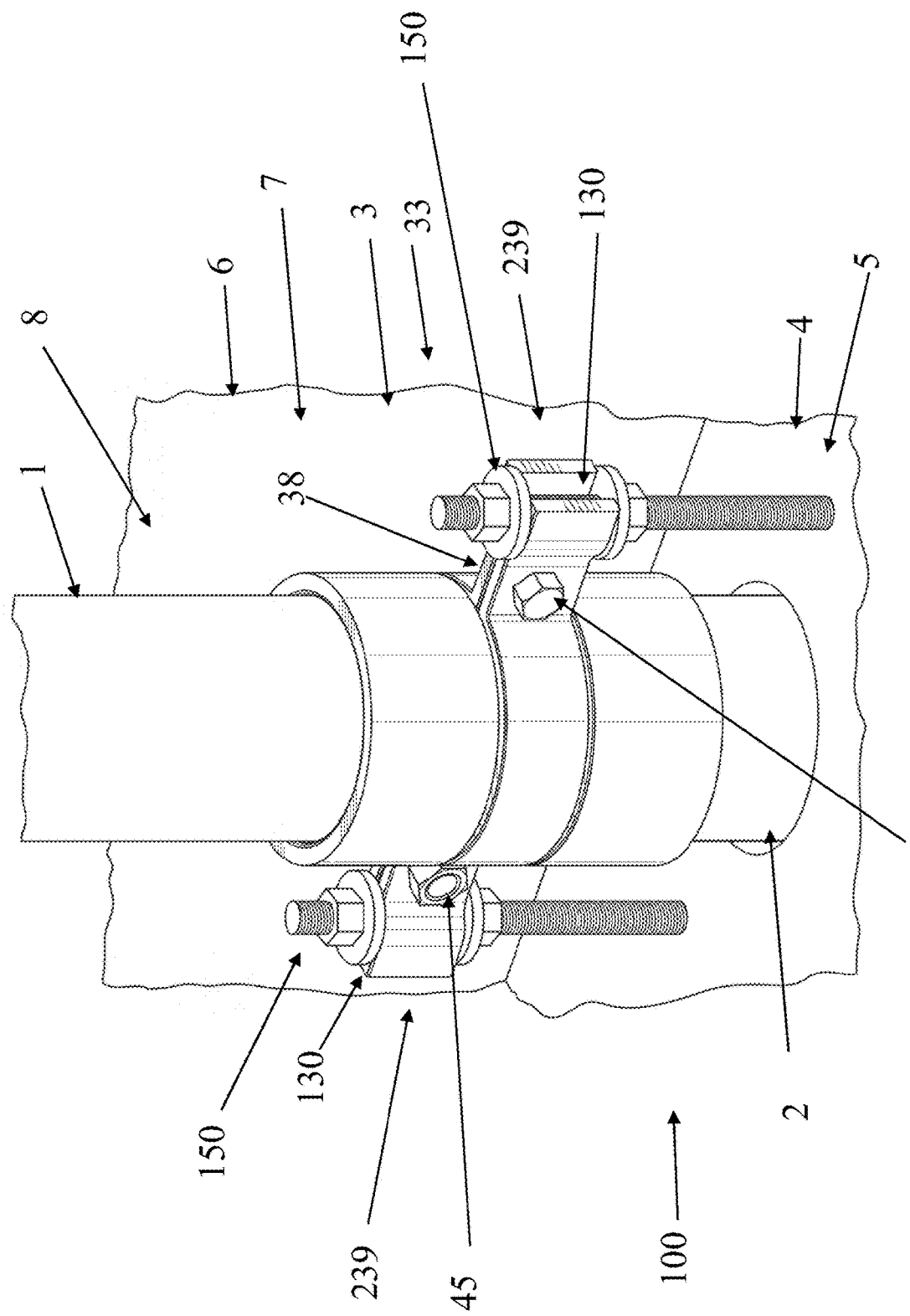
FIG. 5 is a side front side perspective view of the coupling and anchoring system shown in FIG. 1 with pipe lengths received in the pipe openings of the pipe coupling and the anchoring clamp fastened to a horizontal portion of a structure.
Figure 6:
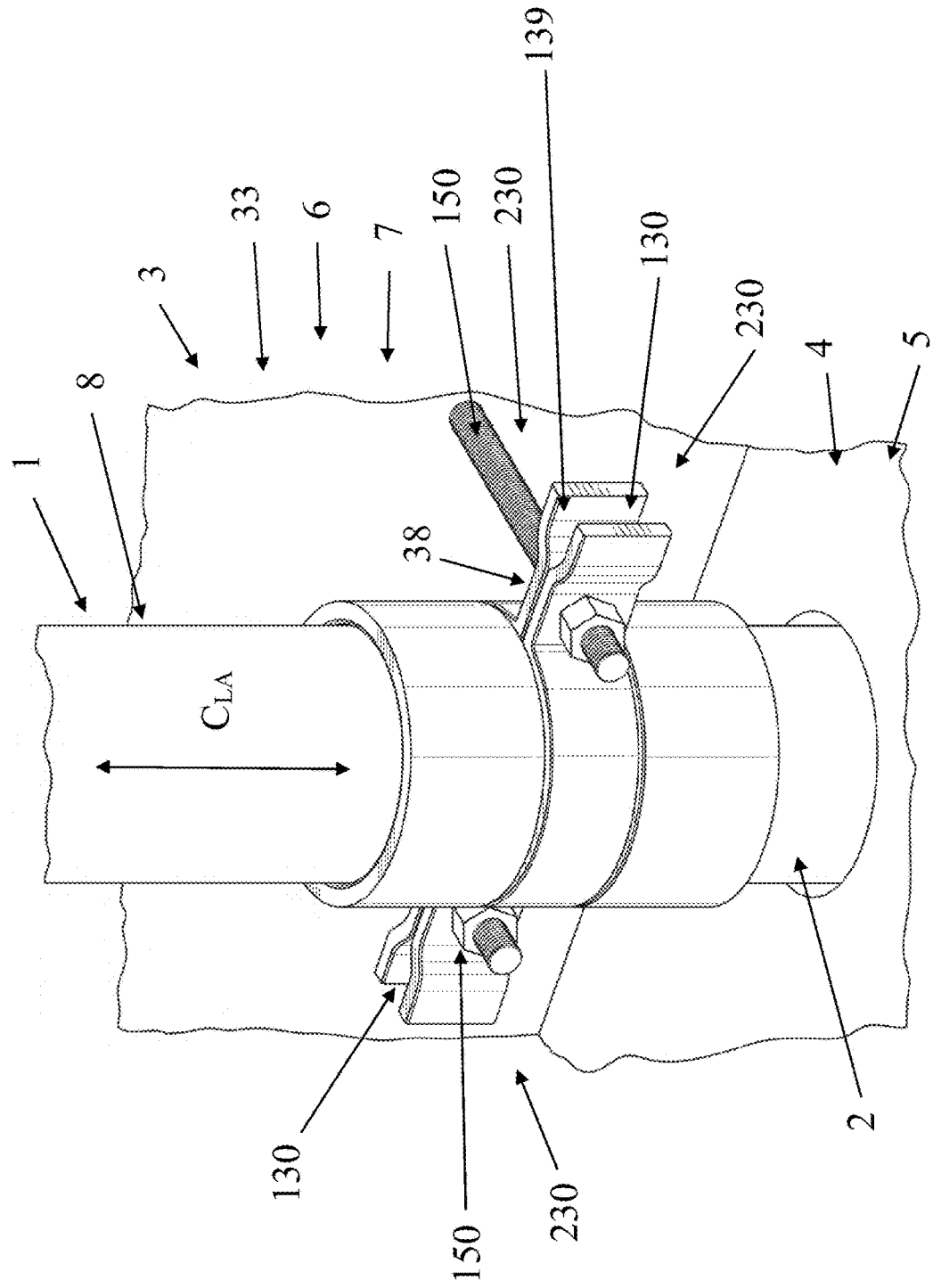
FIG. 6 is a front side perspective view of the pipe riser coupling and anchoring system shown in FIG. 1 with pipe lengths received in the pipe openings of the pipe coupling and the anchoring clamp fastened to a vertical portion of a structure.

The system 100 provides for fluidly coupling a first length of pipe 1 to a second length of pipe 2, as shown for instance in FIGS. 5 and 6, as well as anchoring the lengths of pipe 1, 2, to a structure, as shown generally by reference numeral 3 in FIGS. 5 and 6. It is understood that the structure 3 may be any type of physical structure. In a preferred embodiment, where the lengths of pipe 1, 2 are a riser in a building 33, the structure 3 may be a portion of the building 33.

In a preferred embodiment, the system 100, comprises a pipe coupling, shown generally by reference numeral 10 in FIGS. 1 to 7 and 11 to 13, as well as an anchoring clamp, shown generally by reference numeral 30 in FIGS. 1 to 10.

The pipe coupling 10 extends generally along a coupling longitudinal axis, shown by the line labelled $C_{LA}$ in FIG. 1. The coupling 10 preferably has a first pipe opening 11 at a first end 13 for receiving the first length of pipe 1 along the coupling longitudinal axis $C_{LA}$, and, a second pipe opening 12, at a second end 14, for receiving the second length of pipe 2. It is understood that reference to receiving the lengths of pipe 1, 2 in the openings 11, 12 includes connecting the pipe lengths 1, 2 to the coupling 10 as well as any other steps or features required, such as applying primers and/or adhesive cements, as well as possibly gaskets (not shown) or other elements as would be understood in the art to create a fluid tight seal of the lengths of pipe 1, 2 in the openings 11, 12 of the pipe coupling 10 so as to fluidly couple the first pipe length 1 to the second pipe length 2.

Figure 7:
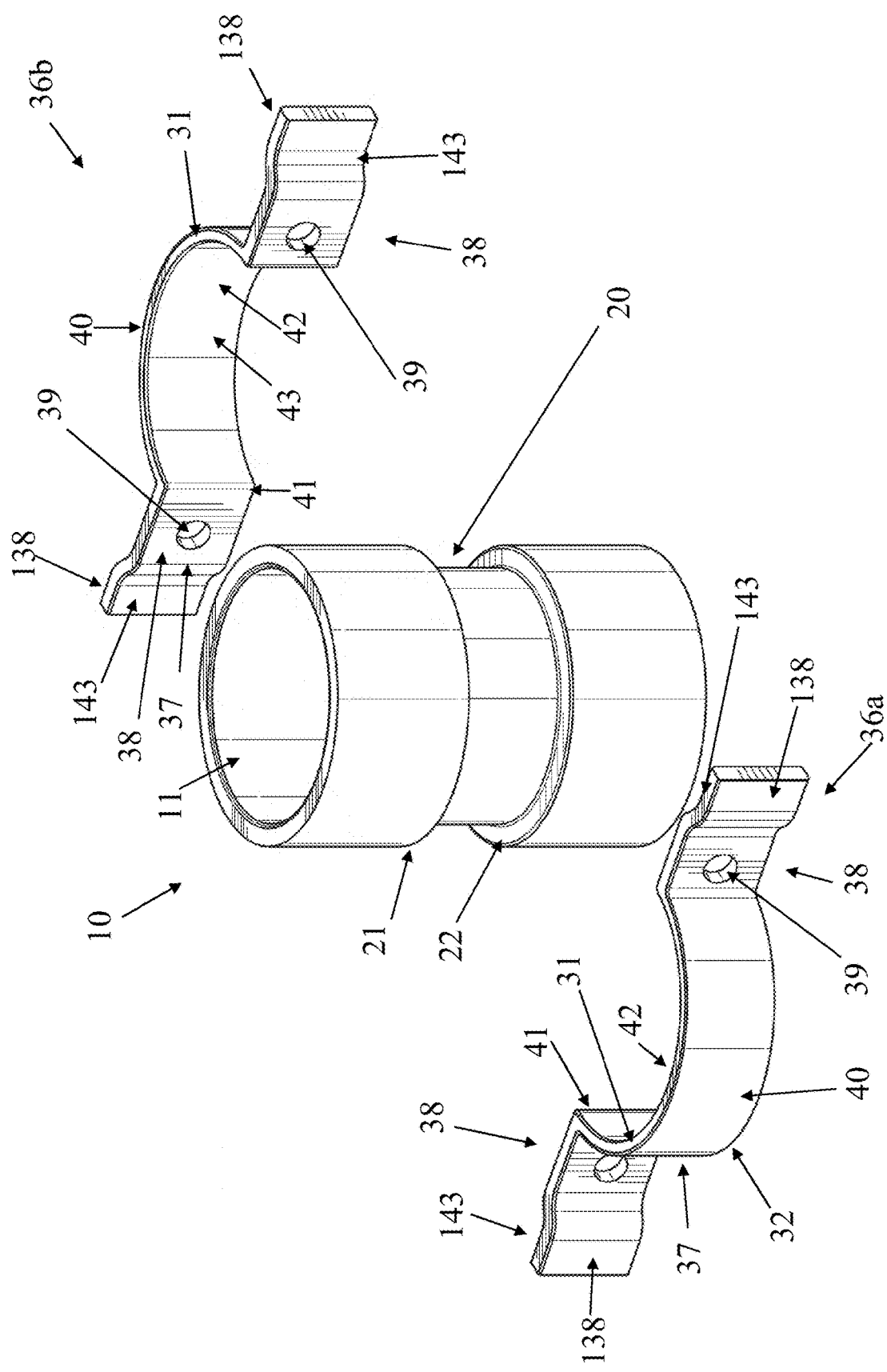
FIG. 7 is a front side perspective view of an unassembled and exploded view of the coupling and anchoring system shown in FIG. 1.
Figure 11:
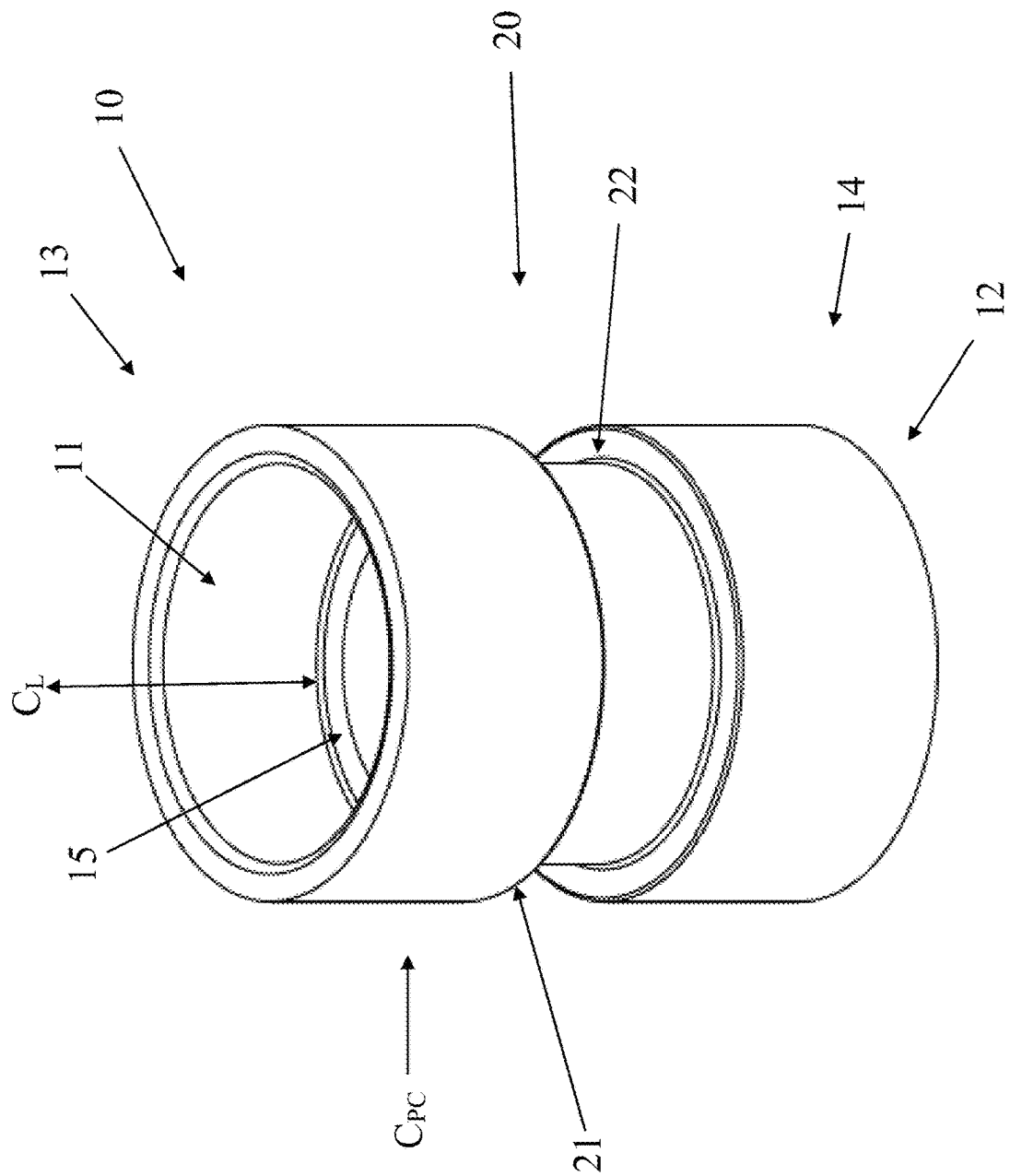
FIG. 11 is a side front perspective view of the pipe coupling in isolation according a preferred embodiment of the present invention.

The pipe coupling 10 also comprises an external peripheral groove, shown generally by reference numeral 20 and illustrated best in FIGS. 7 and 11. The peripheral groove 20 is located axially intermediate the first pipe opening 11 and the second pipe opening 12. The external peripheral groove 20 is defined by a first axial clamp engaging surface 21 which axially faces a second axial clamp engaging surface 22 with the external peripheral groove 20 formed therebetween as illustrated, for instance, in FIGS. 7 and 11.

The anchoring clamp 30 is designed for anchoring the anchoring clamp 30 and the pipe coupling 10 to the structure 3. The anchoring clamp 30 is adapted to be fastened to the structure 3 such as by using a fastening mechanism, a preferred embodiment of which is shown generally by reference numeral 150 in FIGS. 5 and 6.

The anchoring clamp 30 preferably has a first axial coupling engaging surface 31 which is axially opposed from a second axial coupling engaging surface 32. The anchoring clamp 30 is axially sized to be received by the external peripheral groove 20 of the pipe coupling 10 with the first axial coupling engaging surface 31 of the anchoring clamp 30 engaging the first axial clamp engaging surface 21 of the pipe coupling 10, and, the second axial coupling engaging surface 32 of the anchoring clamp 30 engaging the second axial clamp engaging surface 22 of the pipe coupling 10 to restrict the axial movement of the pipe coupling 10 along the coupling longitudinal axis $C_{LA}$ when the anchoring clamp 30 is fastened to the structure 3. Accordingly, when the lengths of pipe 1, 2 have been received in corresponding openings 11, 12, and, the anchoring clamp 30 has been operatively fastened to the structure 3, the lengths of pipe 1, 2, as well as the pipe coupling 10 and the anchoring clamp 30, are anchored to the structure 3.

As shown in FIGS. 5 and 6, the anchoring clamp 30 is designed with dual fastening openings 239. The dual fastening openings 239 may optionally fastening the anchoring clamp 30 to a parallel portion 6 of the structure 3 which is parallel to the clamp longitudinal axis $C_{LA}$ as illustrated in FIG. 6, for example. The dual fastening openings 239 may also optionally fasten the anchoring clamp 30 to a perpendicular portion 4 of the structure 3 which is perpendicular the clamp longitudinal axis $C_{LA}$, as illustrated in FIG. 5 for example. In the preferred embodiment where the lengths of pipe 1 and 2 are a pipe riser 8 extending vertically upwards in a building 33, the perpendicular portion 4 of the structure 3 with respect to the clamp longitudinal axis $C_{LA}$ may be a concrete slab floor 5 and the parallel portion 6 may be a vertical wall 7, for example, of the building 33. According to one preferred embodiment, the dual fastening openings 239 may comprise the perpendicular fastener receiving openings 39 of the laterally extending connection portions 38 and the axial openings 139 of the axial channels 130.

Figure 8:
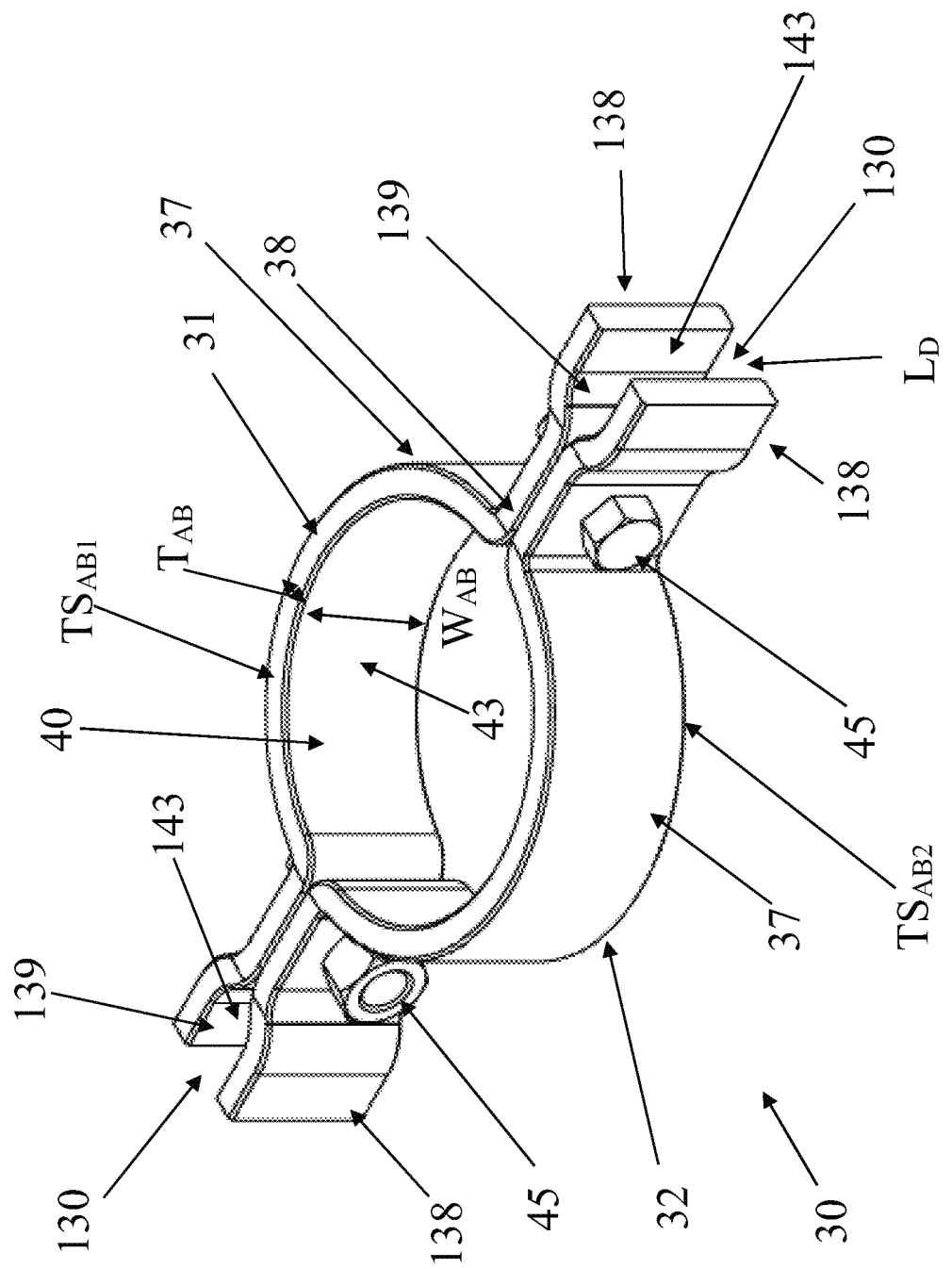
FIG. 8 is a side front perspective view of the anchoring clamp in isolation with arc band fasteners received for applying a compression connection force to connect the adjacent arced band to assemble the anchoring clamp according to a preferred embodiment of the present invention.
Figure 9:
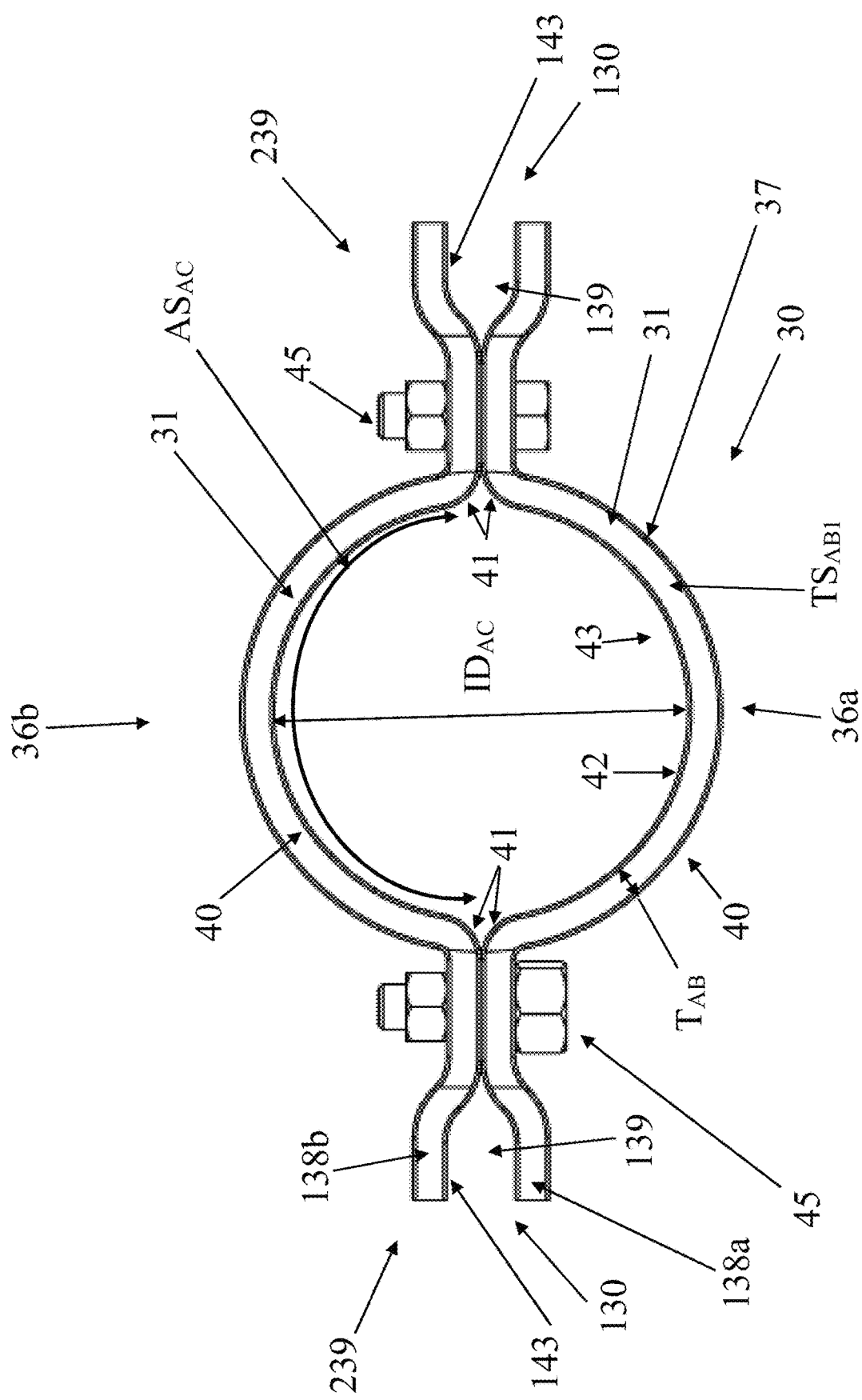
FIG. 9 is a top plan view of the anchoring clamp shown in FIG. 8.
Figure 10:
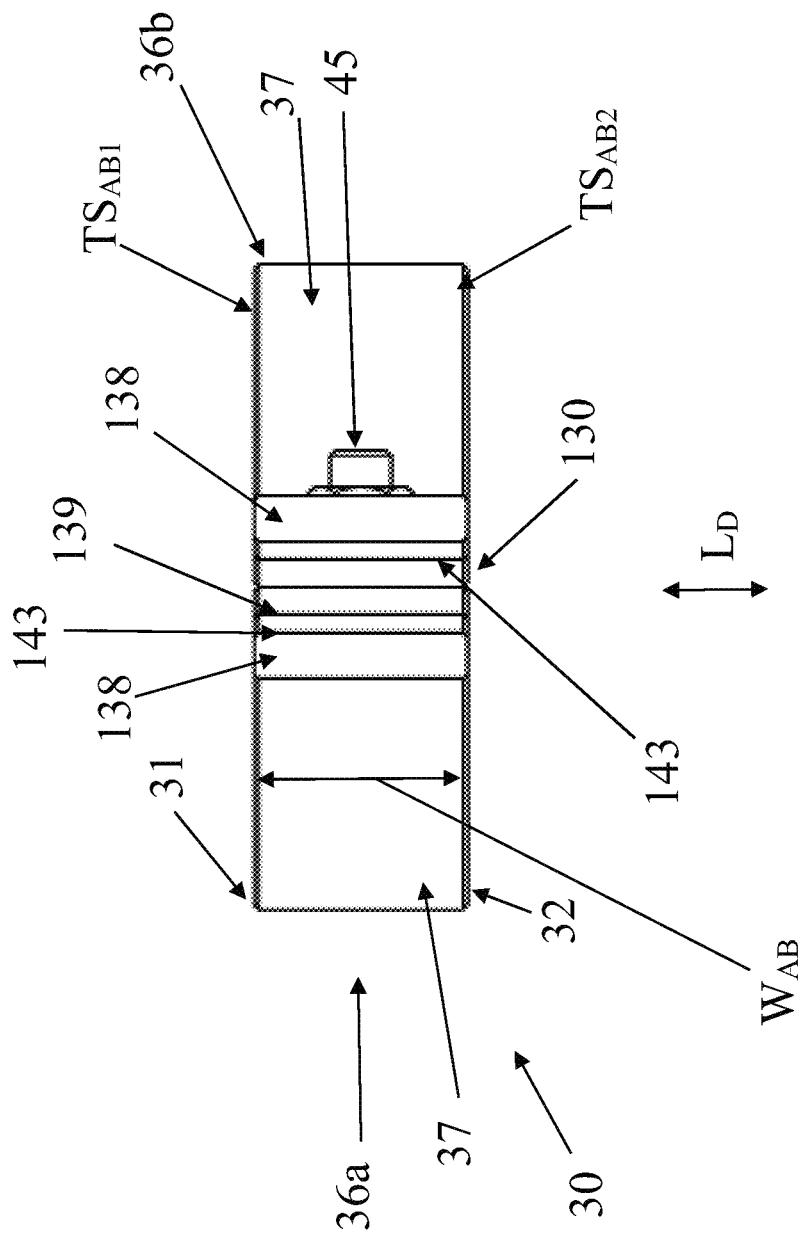
FIG. 10 is a side view of the anchoring clamp shown in FIG. 8.

In a preferred embodiment, the anchoring clamp 30 is formed of two or more arced bands (identified generally by reference numeral 36 and individually by references 36a and 36b). Each arced band 36 preferably has a central arc portion 40 interposed between two laterally extending connection portions 38. In a preferred embodiment, as illustrated in FIGS. 8, 9 and 10, the laterally extending connecting portions 38 of the arced band 36a overlaps with laterally extending connecting portions 38 of adjacent arced bands 36b to connect adjacent arced bands 36 together. In this way, the anchoring clamp 30 may be assembled about the external peripheral groove 20 of the pipe coupling 10 with each central arc portion 40 of a corresponding arced band 36 forming an arc segment $AS_{AC}$ (shown in FIG. 9) of the anchoring clamp 30 when the arc bands 6 are connected to assemble the anchoring clamp 30 about the external peripheral groove 20.

In a preferred non-limiting embodiment, as illustrated in FIGS. 1 to 10, the anchoring clamp 30 is formed by two identical arced bands 36a, 36b, and for ease of illustration, the description and drawings will be based on this preferred non-limiting embodiment. However, it is understood that the anchoring clamp 30 may optionally be made of two, three or more arced bands 36, with each arced band 36 having overlapping laterally extending connecting portions 38 to connect adjacent arced bands 36 together and assemble the anchoring clamp 30 about the external peripheral groove 20, with each central arc portion 40 of each arc band 36 forming an arc segment $AS_{AC}$ of the anchoring clamp 30 when the anchoring clamp 30 is assembled about the external peripheral groove 20. In the preferred non-limiting example where the anchoring clamp 30 is formed of two arced bands 36a and 36b, it is further preferred that they are identical. In this way, each of the central arc portions 40 extend for an arc segment $AS_{AC}$ of about 180°, and, the laterally extending connection portions 38 extend laterally from the diametrically opposed ends 41 of the central arc portion 40 for connecting together the two substantially identical arced bands 36a, 36b about the external peripheral groove 20 of the pipe coupling 10. It is understood that if the arced bands 36a, 36b are identical, this will increase the efficiency of manufacturing and, also, storing of the components of the system 100 and, also, will simplify the kit 101 as the number of different component parts of the kits 101 would be decreased.

In either case, each of the arced bands 36 has a radially inner side 42 comprising an inner concave surface 43 of the corresponding central arc portions 40 as shown, for example, in FIGS. 7 and 9. In a preferred embodiment, the first and second axial coupling engagement surface 31, 32 of the anchoring clamp 30 are substantially perpendicular to the inner concave surface 43 of the corresponding arc band portions 40 of the arc bands 36.

In a preferred embodiment, the assembly of the arc bands 36a, 36b about the external peripheral groove 20 of the pipe coupling 10 by connecting the overlapping lateral extending connecting portions 38 combines the central arc portions 40 to define an internal clamp diameter $ID_{AC}$ of the anchoring clamp 30. The internal clamp diameter $ID_{AC}$ is preferably comparable to an outer diameter $OD_{PG}$ of the external peripheral groove 20 of the pipe coupling 10. In this way, the anchoring clamp 30 may fit adjacently or snugly about the external peripheral groove 20 when the arc bands 36 are connected to assemble the anchoring clamp 30 about the peripheral groove 20. Furthermore, as illustrated in FIG. 9 for example, the laterally extending connecting portions 38 extend laterally from the central arc portion 40 and thus are also radially separated from the internal diameter $ID_{AC}$ of the anchoring clamp 30. In this way, during assembly of the anchoring clamp 30 by connecting the overlapping laterally extending connecting portions 38, the internal diameter $ID_{AC}$ of the anchoring clamp 30 is unaffected by any potential compression connecting forces applied to the overlapping lateral extending connection portions 38 during assembly of the anchoring clamp 30. This potentially prevents any excessive compression connecting forces that may be applied to the overlapping connecting extending connecting portions 38, such as through potentially overtightening of arc band fasteners 45, from adversely affecting the pipe coupling 10, such as by unintentionally decreasing the internal clamp diameter $ID_{AC}$ of the anchoring clamp 30. Furthermore, while the anchoring clamp 30 is shown in the figures, such as FIG. 9, as being assembled by connecting the overlapping laterally extending connecting portions 38 of adjacent arc band 36a, 36b with the arc band fasteners 45 received in perpendicular fastener openings 39, it is understood that other types of connecting or combining could also be used, including, for example, adhesives, soldering or even welding. In a further preferred embodiment, the perpendicular fastener receiving openings 39 can optionally be used to receive a fastening mechanism 150 as shown for example in FIG. 6 to both combine the overlapping connecting extending connecting portions 38, thereby assembling the anchoring clamp 30, and, also, to fasten the anchoring clamp 30 to the parallel portion 6 of the structure 3 which could in the preferred embodiment be a vertical wall 7 of a building 33. In a preferred embodiment, the anchoring clamp 30 may be integrally formed (not shown) about the peripheral groove 20 of the pipe coupling 10 at the time of manufacture.

In a further preferred embodiment, each of the bands 36 further comprise at least one laterally extending arc element, shown generally by reference numeral 138, having an inner concave element surface 143 on the radially inner side 42 of the arc band 36. The laterally extending arc element 138 extends laterally from at least one of the laterally extending connecting portions 38. In this way, when the adjacent arc bands 36 are connected to assemble the arc clamp 30 about the exterior peripheral groove 20, the inner concave element surface 143 of at least two of the laterally extending arc elements 138 face each other to form at least one axial channel 130. The axial channel 130 is parallel to the coupling longitudinal axis $C_{LA}$ and defines an axial opening 139. The axial opening 139 may optionally receive a fastening mechanism, shown generally by reference numeral 150, for example in FIG. 5, in a longitudinal direction $L_D$ which is parallel to the coupling longitudinal axis $C_{LA}$ to fasten the anchoring clamp 30 to a perpendicular portion 4 of the structure 3 which is perpendicular to the longitudinal direction $L_D$ as well as the coupling longitudinal axis $C_{LA}$. In the preferred embodiment where the structure 3 is a building 33, the perpendicular portion 4 may be a concrete slab 5 of the building 33. In this case, the fastening mechanism 150 may comprise a bolt extending through the axial channel 130 so as to fasten the anchoring clamp 30 to the structure 3. It is understood that the fastening mechanism 150 may be any type of fastening mechanism which can fasten the anchoring clamp 30 to a perpendicular portion 4 of the structure 3, such as a bolt extending into the perpendicular portion 4 as shown in FIG. 5. A combination of bolts and/or washers may also be used, as would be known in the art, to facilitate fastening the anchoring clamp 30 to the perpendicular portion 4 of the structure 3 which, in one preferred embodiment, is a concrete floor slab 5.

As indicated above, in a preferred embodiment, the anchoring clamp 30 is formed by two identical arc bands 36a, 36b with the central arc portion 40 of each of the arc bands 36a, 36b forming about 180° degrees of the arc segment $AS_{AC}$ of the anchoring clamp 30, and, the laterally extending connecting portions 38 extending laterally from the opposed ends 41 of the central arc portion 40 for connecting the two substantially identical arc bands 36a, 36b about the external peripheral groove 20 of the pipe coupling 10. In this preferred embodiment, each of the two substantially identical arc bands 36a, 36b further comprise two laterally extending arc elements 138, each of the laterally extending arc elements 138 having their inner concave element surface 143 on the radially inner side 42 of the corresponding arc bands 36a, 36b. Furthermore, in this preferred embodiment, each laterally extending arc element 138 may extend laterally from one of the laterally extending connecting portions 38. In this way, when the adjacent arc bands 36a, 36b are connected to assemble the anchoring clamp 30 about the exterior peripheral groove 20, the inner concave element surface 143 of one of the laterally extending arc elements 138a faces a corresponding inner concave element surface 143 of the laterally extending arc element 138b of the adjacent arc band 36b to form two axial channels 130 diametrically opposed on opposite sides of the anchoring clamp 30. Each of the axial channels 130 so formed is parallel to the coupling longitudinal axis $C_{LA}$. In this preferred embodiment, as illustrated in FIG. 9, each of the axial channels 130 define a corresponding axial opening 139 for axially receiving the fastening mechanism 150, as shown in FIG. 5. The axial channels 130 receive the fastening mechanism 150 in the longitudinal direction $L_D$ parallel to the coupling longitudinal axis $C_{LA}$ to fasten the anchoring clamp 30 to the perpendicular portion 4 of the structure 3 which perpendicular portion 4 is perpendicular to the longitudinal direction $L_D$ and the clamp longitudinal axis $C_{LA}$. Therefore, the preferred non-limiting embodiment where the two or more adjacent arc bands 36 comprise two substantially identical arc bands 36a, 36b form two diametrically opposed axial channels 130 on the anchoring clamp 30.

As indicated above, each of the laterally extending connecting portions 38 also comprise at least one perpendicular fastener receiving opening 39 arranged perpendicular to the coupling longitudinal axis $C_{LA}$. Furthermore, at least one perpendicular fastener receiving opening 39 on each of the laterally extending connecting portions 38 are arranged to align with a corresponding perpendicular fastener receiving opening 39 of an overlapping laterally extending portion 38 of an adjacent arc band 36b during assembly of the anchoring clamp 30 about the peripheral groove 20. In this preferred embodiment, the laterally extending connecting portions 38 have a single perpendicular fastener receiving opening 39 such that they would align with the corresponding perpendicular fastener receiving opening 39 of the overlapping laterally extending connecting portion 38 of the adjacent arc band 36b but it is understood that additional perpendicular fastener receiving openings 39 may be formed on the laterally extending connecting portions 38 so that at least one aligns with a corresponding opening 39 on the overlapping portion 38 of the adjacent arc bands 36b during assembly of the arc anchoring clamp 30. The perpendicular fastener receiving openings 39 are sized to receive the arc band fasteners 45 for applying the compression connection forces to connect the adjacent arc bands 36a, 36b and assemble the anchoring clamp 30 about the peripheral groove 20 as discussed above. In a further preferred embodiment, the perpendicular fastener receiving openings 39 of the laterally extending connecting portions 38 optionally also receive the fastening mechanism 150 therethrough to both connect the adjacent arc bands 36a, 36b together for assembling the anchoring clamp 30 about the peripheral groove 20, and, also to fasten the anchoring clamp 30 to a parallel portion 6 of the structure 3 which parallel portion 6 is parallel to the coupling longitudinal axis $C_{LA}$, as shown in FIG. 6. In this case, the axial openings 139 defined by the axial channels 130 and the perpendicular fastener receiving openings 39 in the lateral extending connecting portions 38 form dual fastening openings 239 for optionally receiving the fastening mechanism 150 either perpendicular to the coupling longitudinal axis $C_{LA}$ or parallel to the coupling longitudinal axis $C_{LA}$, to optionally anchor the anchoring clamp 30 to the parallel portion 6 of the structure 3 or the perpendicular portion 4 of the structure 3. These dual fastening openings 239 increase the versatility of the system 100 and kit 101 by permitting optional fastening to perpendicular portions 4 and parallel portions 6 of the same structure 3. This can be useful, particularly in the preferred embodiment where the lengths of pipe 1, 2 form a pipe riser 8 and the structure 3 is a building 33 such that it is not always certain whether or not a perpendicular portion 4 or a parallel portion 6 of the structure 3 will be available to fasten the anchoring clamp 30 thereto.

In one preferred embodiment, each arc band 36a, 36b is manufactured from a strip of metal 37, as shown for instance in FIG. 7, with the central arc portion 40 interposed between the laterally extending connection portions 38 and the laterally extending arc element 138 being formed by bending the strip of metal 37. In a preferred embodiment, the strip of metal 37 can be made of any appropriate type of metal including, without limitation, carbon steel and stainless steel. The specific type of metal used for the strip of metal 37 will also be dependent on the environment in which the system 100 will eventually be placed. Furthermore, the pipe coupling 10 is preferably manufactured from plastic and potential polymer materials for the coupling 10 would include PVC and CPVC. Again, the specific type of polymer materials used for the pipe coupling 10 would depend on the environment in which the system 100 will be placed and, in particular, the type of fluid which may be carried within the lengths of pipe 1, 2 and also the pipe coupling 10 so as to avoid adverse interactions.

The strips of metal 37 used to form the arc bands 36a, 36b preferably have a band thickness $T_{AB}$ along first and second transverse surfaces $TS_{AB}$ of arc band 36a, 36b comparable to a groove depth $D_{PG}$ of the external peripheral groove 20.

Furthermore, these strips of metal 37 also preferably have a band width $W_{AB}$ across the radially inner side 42 comparable to a groove width $W_{PG}$ of the external peripheral groove 20 between the axially facing first and second axial clamp engaging surfaces 21, 22. Furthermore, as indicated above, preferably the first and second axial coupling engaging surfaces 31, 32 of the anchoring clamp 30 are substantially perpendicular to the inner concave surface 43 of each of the arc bands 36a, 36b which is conducive to using a strip of metal 37 to form the arc bands 36a, 36b. Accordingly, with this arrangement, when the arc bands 36a, 36b are connected to assemble the anchoring clamp 30 about the peripheral groove 20, the anchoring clamp 30 is axially sized to be received axially within the external peripheral groove 20 with one of the transverse surfaces $TS_{AB1}$ forming the first axial coupling engaging surface 31 of the anchoring clamp 30 engaging the first axial clamp engaging surface 21 of the pipe coupling 20, and, the other transverse surface $TS_{AB2}$ forming the second axial coupling engaging surface 32 of the anchoring clamp 30 engaging the second axial clamp engaging surface 22 of the pipe coupling 10 to restrict the axial movement of the pipe coupling 10 when the anchoring clamp 30 is fastened to the structure 3. In this way, the assembled anchoring clamp 30 will have a thickness $T_{AB}$ and width $W_{AB}$ which is comparable to the groove depth $D_{PG}$ and groove width $W_{PG}$ of the external groove 20 so that the assembled anchoring clamp 30 is preferably completely contained in the perpendicular groove 20.

In a further preferred embodiment, the pipe coupling 10 has a coupling external circumference $C_{PC}$ extending radially about the coupling longitudinal axis $C_L$ and the external peripheral groove 20 extends radially inwardly and about the coupling external circumference $C_{PC}$. Furthermore, the first axial clamp engaging surface 21 and the second axial clamp engaging surface 22 may extend radially about the coupling external surface $C_{PC}$ thereby forming the external peripheral groove 20 therebetween. Accordingly, in this preferred embodiment, the central arc portions 40 of the arc bands 36 that are assembled to form the anchoring clamp 30 will be flush with the coupling external circumference $C_{PC}$. In this way, it is less likely that dirt or other objects or people interfere with the system 100 when installed in a structure 3, such as a building 33.

Figure 12A:
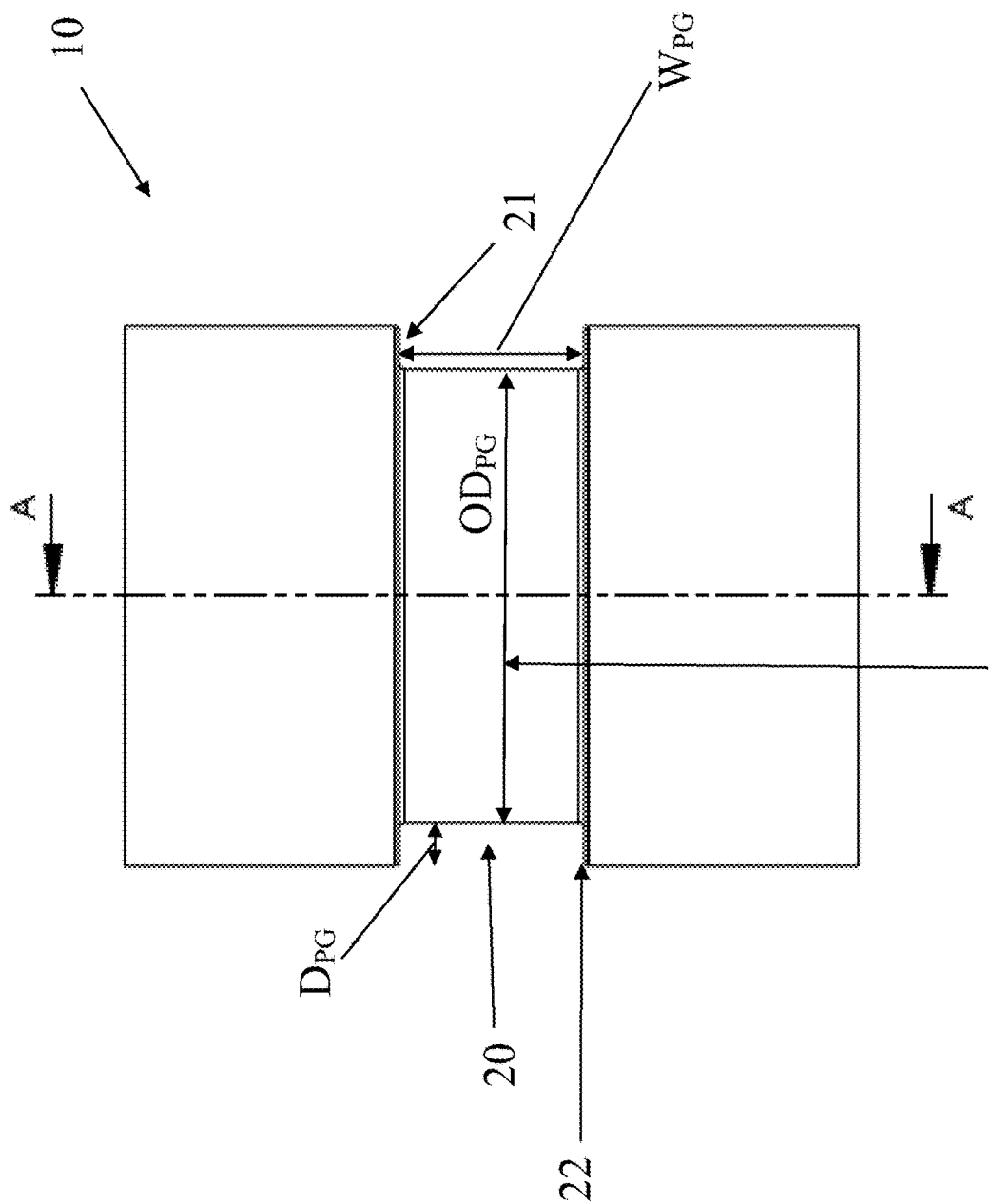
FIG. 12a is a side view of the pipe coupling shown in FIG. 11.

When installed in a structure 3, such as a building 33, in a further preferred embodiment, as illustrated in FIGS. 12a, b and c, the first pipe opening 11 and the second pipe opening 12 are sized to receive the first and second pipe lengths 1, 2, respectively. In a preferred embodiment, the coupling 10 is designed to couple pipe lengths 1, 2, which are identical. Because of this, the first pipe opening 11 and the second pipe opening 12 would generally be identical. Moreover, the pipe coupling 10 would be symmetrical about the coupling longitudinal axis $C_{LA}$ as well as an axis perpendicular to the coupling longitudinal axis $C_{LA}$ passing in the middle of the external pipe groove 20.

In a further preferred embodiment, the first pipe opening 11 has, at a first pipe stop axial location $P_{15}$, a first radial pipe stop 15 extending radially inward from a first sidewall 17 of the first opening 11. The first radial pipe stop 15 acts to limit the insertion of the first length of pipe 1 into the first opening 11 along the coupling longitudinal axis $C_{LA}$. In particular, the first length of pipe 1 would generally be received into the first opening 11 until a longitudinal end 9 of the first length of pipe 1 comes into abutting contact with the first radial pipe stop 15, as shown for instance in FIG. 12c. Accordingly, the first radial pipe stop 15 prevents further insertion of the first length of pipe 1 into the first opening 11. Similarly, the second pipe opening 12 has, at a second pipe stop axial location $P_{16}$, a second radial pipe stop $P_{16}$ extending radially inwardly from a second sidewall 18 of the second opening 12 for abutting contact with a longitudinal end 9 of the second length of pipe 2 to prevent further insertion of the second length of pipe 2 in to the second opening 12. For ease of illustration, FIG. 12c shows only the first of the pipe 1 being inserted into the first opening 11 but it is understood that in a similar manner the second length of pipe 2 would be inserted in the second opening 12. Moreover, in a preferred embodiment where the first opening 11 and second opening 12 are substantially identical, the second length of pipe 1 shown inserted into the first opening 11 could easily also correspond to the second length of pipe 2 being inserted into the second opening 12 until the longitudinal end 9 is in abutting contact with the second radial pipe stop 16.

Figure 12B:
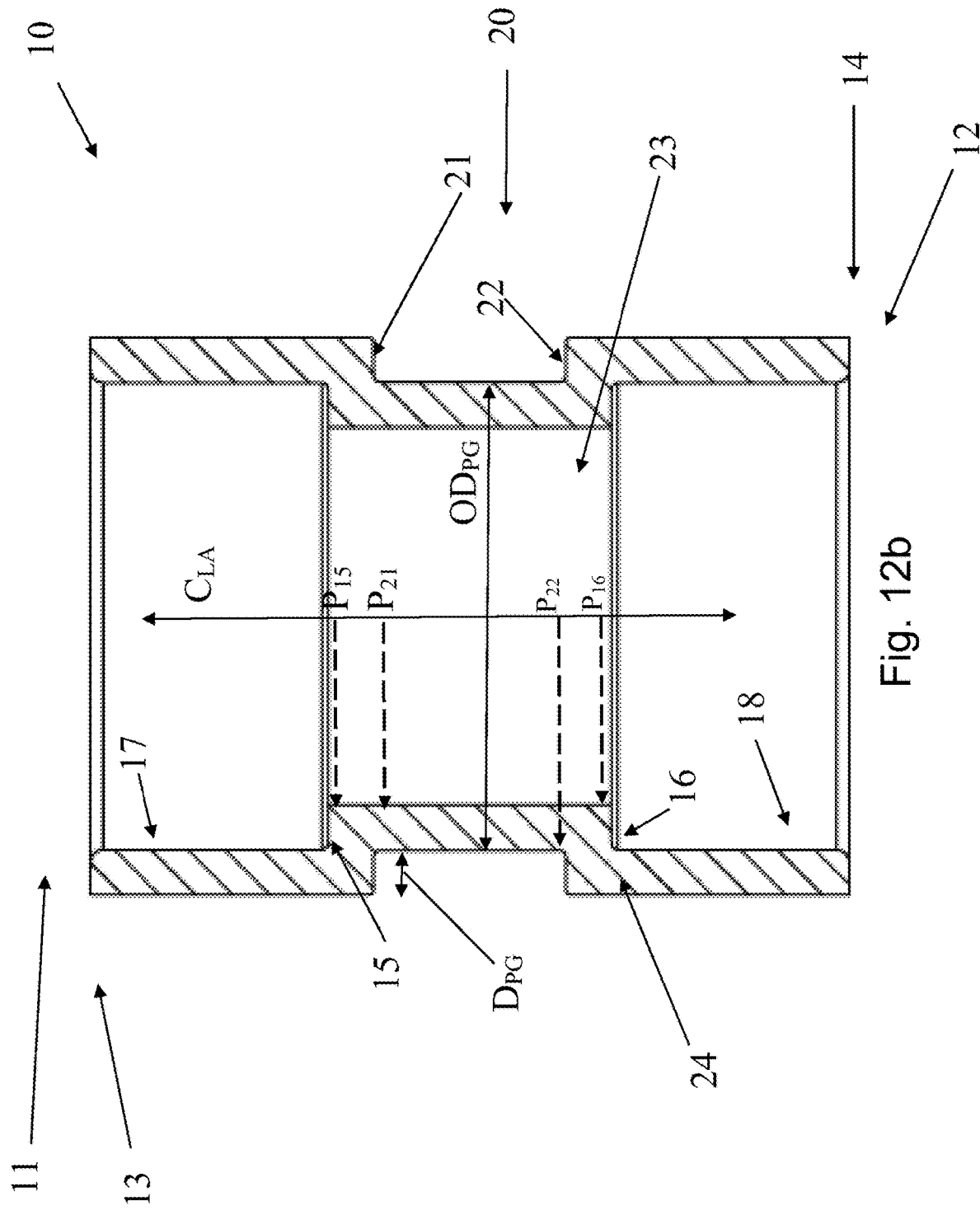
FIG. 12b is a cross-sectional view of the pipe coupling shown in FIG. 12a along dashed double dot line A.
Figure 12C:
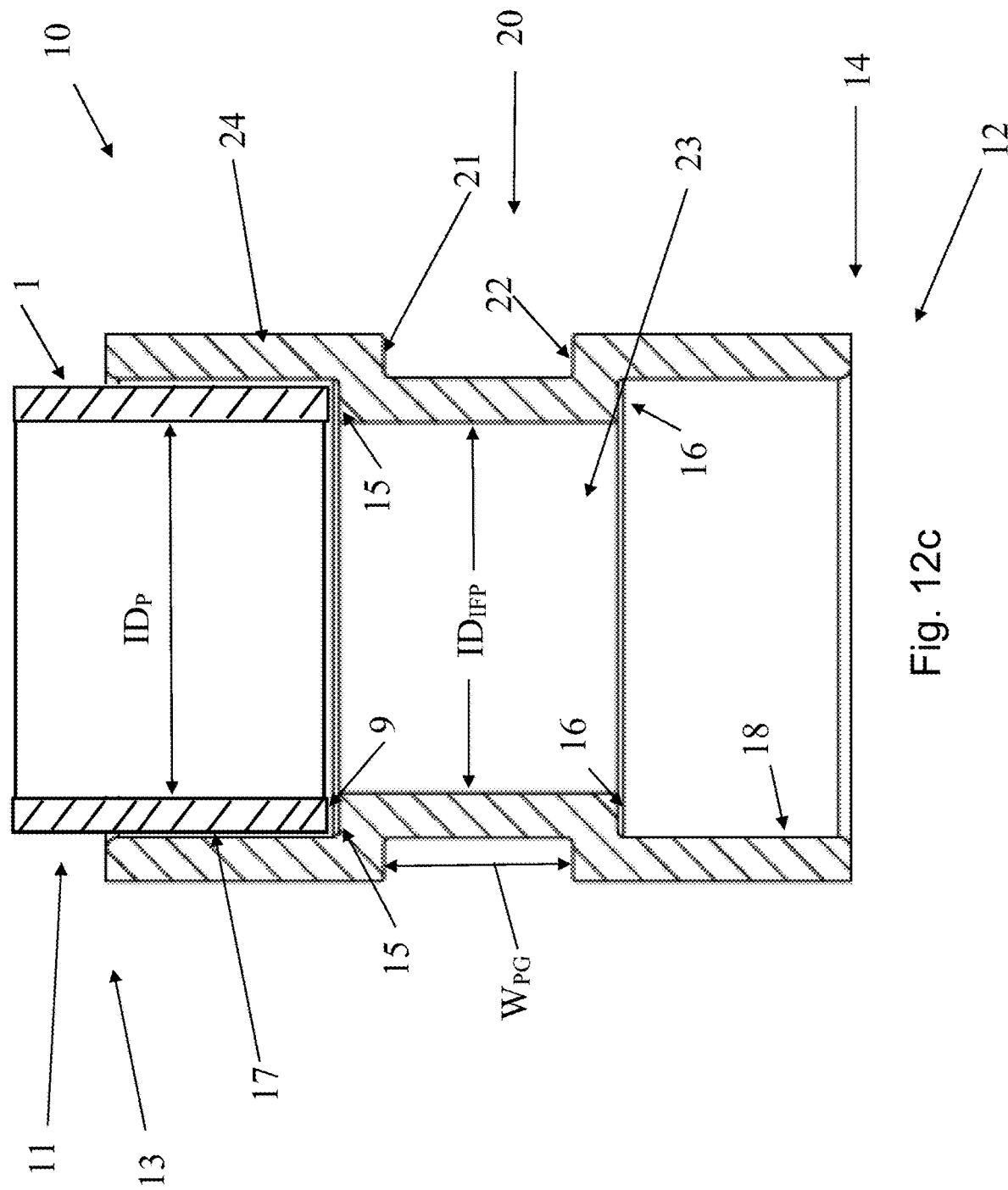
FIG. 12c is a cross-sectional view of the pipe coupling as shown in FIG. 12b also showing a pipe length in cross-section received in the first opening of the pipe coupling.
Figure 13:
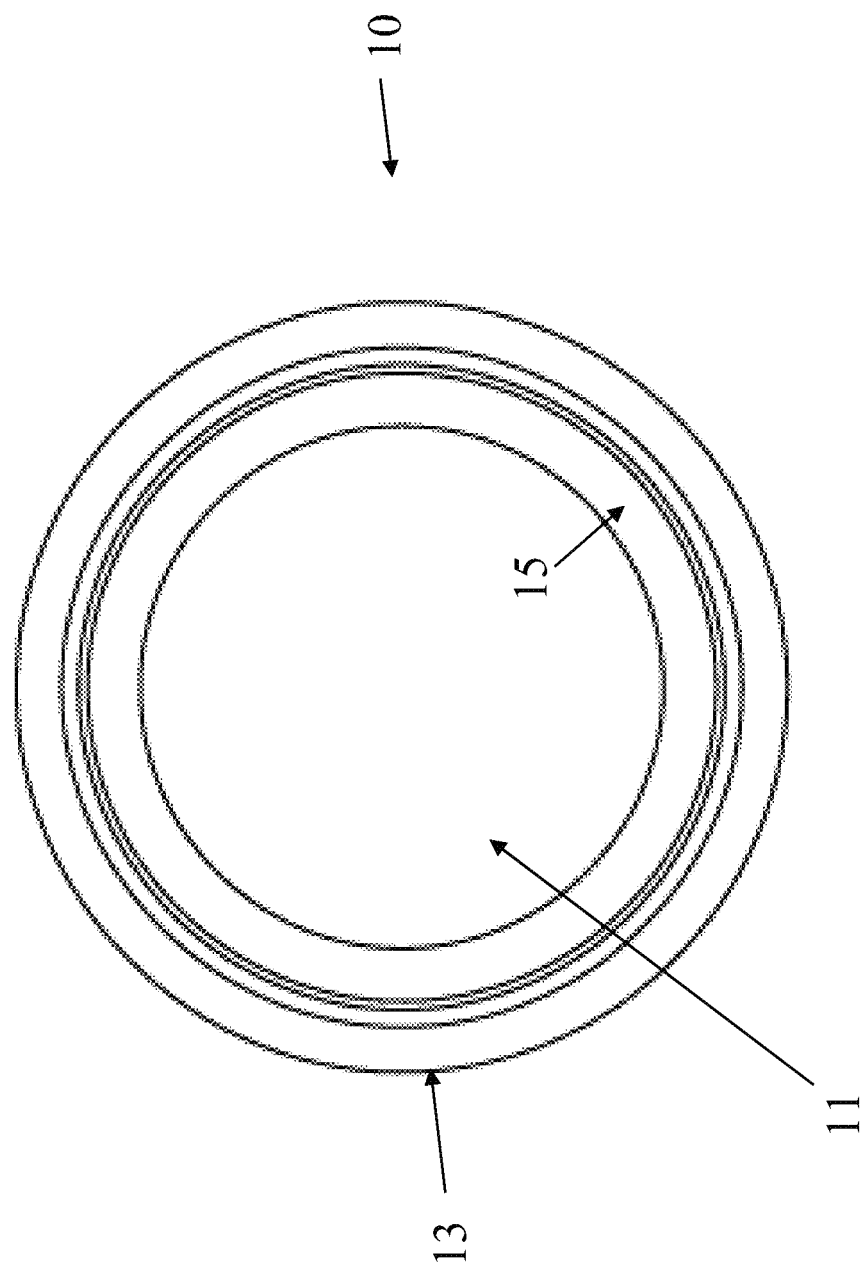
FIG. 13 is a top plan view of the pipe coupling shown in FIG. 11.

As also illustrated in FIG. 12b, the external peripheral groove 20 is located axially between the first clamp engaging surface 21 axial position $P_{21}$ and the second clamp engaging surface 22 axial position $P_{22}$. Therefore, as illustrated in FIG. 12b, the external peripheral groove 20 is located axially interposed between the first and second pipe stop axial position $P_{15}$, $P_{16}$, representing the axial position of the first radial pipe stop 15 and the second radial pipe stop 16. In this way, the cross-section of the pipe coupling 10 has an "hour-glass" configuration as illustrated, for instance, in FIGS. 12a and 12b. Furthermore, with this arrangement, the thickness of the wall of the pipe coupling 10 can be relatively consistent from the first end 13 to the second 14 with the peripheral groove 20 being formed within the pipe coupling 10. This potentially decreases the cost of manufacturing the pipe coupling 10.

In a further preferred embodiment, the pipe coupling 10 comprises an internal fluid passageway 23 fluidly connecting the first pipe opening 11 and the second pipe opening 12. The internal fluid passageway 23 preferably has an inner passageway diameter $ID_{IFPS}$, shown for instance in FIG. 12c. To decrease fluid friction, it is preferred if the inner passageway diameter $ID_{IFP}$ of the internal fluid passageway 23 is consistent with the first inner diameter $ID_P$ of the lengths of pipe 1, 2. For ease of illustration, FIG. 12c shows the internal diameter $ID_P$ of the first length of pipe 1 but it is understood that the second length of pipe 2 would be substantially the same as the first length of pipe 1 in this preferred embodiment. Accordingly, by having a substantially constant internal diameter $ID_{IFP}$ through the coupling 10, fluid flow friction is potentially decreased. This potentially has a corresponding decrease in pressure loss of the fluid passing through the coupling 10. This also further emphasises the substantially hour-glass cross section 24 of the pipe coupling 10 as illustrated in FIGS. 12b and 12c.

A further advantage of the hour-glass cross section 24 of the pipe coupling 10 is that overtightening of the anchoring clamp 30 can now be decreased. This is the case for a number of reasons, including that the anchoring clamp 30 would be assembled about the external peripheral groove 20 which, in a preferred embodiment, is located axially interposed between the first and second pipe stop axial positions $P_{15}$ and $P_{16}$. In this way, the anchoring clamp 30 would not be axially coincident with the length of pipes 1, 2. Accordingly, any potential damage that could be caused by overtightening of the anchoring clamp 30 may be avoided as the anchoring clamp 30 is not axially coincident with the pipe length 1, 2 given the relative axial position $P_{15}$, $P_{16}$ of the radial pipe stops 15, 16 with respect to the external peripheral groove 20 and, therefore, the assembled anchoring clamp 30.

Furthermore, the pipe stops 15, 16 not only prevent further insertion of the lengths of pipe 1, 2 but also restrict axial movement of the pipe lengths 1, 2 when they are properly received in the openings 11, 12 respectively of the pipe coupling 10. This may assist with anchoring the lengths of pipe 1, 2. The hour-glass cross section 24 of the pipe coupling 10 also permits the first axial coupling engaging surface 31 and the axially opposed second axial coupling engagement surface 32 of the anchoring clamp 30 to engage the first and second axial clamp engaging surfaces 21, 22 of the pipe coupling 10 without necessarily having a tight fit between the anchoring clamp 30 and the pipe coupling 10 because of the thickness $T_{AB}$ of the arc bands 36a, 36b and the depth $D_{PG}$ of the peripheral groove 20. Accordingly, the hour-glass cross section 24 of the pipe coupling 10 may allow the anchoring clamp 30 to be assembled about the peripheral groove 20 without relying on a "tight fit" between the anchoring clamp 30 and the pipe coupling 10 for anchoring purposes and, moreover, incorporates the pipe stops 15, 16 which can prevent axial movement of the pipe lengths 1, 2 and may assist in anchoring the pipe lengths 1, 2 to the structure 3, such as a building 33 when the lengths of pipe 1, 2 form a part of the pipe riser 8.

As indicated above, in a further aspect, the invention provides a kit 101 comprising the pipe coupling 10 and an anchoring clamp 30 assembly comprising the two or more arc bands 36a, 36b. The pipe coupling 10 and arc bands 36a, 36b can have the features as described above with respect to the system 100. The kit 101 does not necessarily need to comprise the arc band fasteners 45 or the fastening mechanism 150 as these would be common in the field but the kit 101 may optionally comprise these elements 45, 150 also. In the preferred embodiment, where the anchoring clamp 30 is formed of identical arc bands 36a, 6b, the kit 101 may have a sufficient number of substantially identical arc bands 36a, 36b so as to assemble the anchoring clamp 30 about the peripheral external groove 20. In the preferred embodiment where two arc bands 36a, 36b are utilized, the arc clamp 30 assembly may comprise two identical arc bands 36a, 36b but it is understood that the invention is not limited to this preferred embodiment.

For clarity, it is understood that the term "fluid" and, also, "fluidly" as used herein can comprise liquids, foams, slurries, plasmas and/or gases. The pipe coupling 10, as well as the material used to create the pipe coupling 10, would be selected accordingly.

It is also understood that the above preferred embodiment to the present disclosure are considered non-limiting embodiments to provide an overall understanding of the principals of the structure, function, manufacture and/or use of the coupling and anchoring system 100 and kit 101 therefore disclosed herein. This description should be understood as illustrative of the invention but should not be considered as limiting.

Furthermore, while the invention has been described with reference to a preferred embodiment where the lengths of pipe 1, 2 represent a pipe riser 8 in a building 33, the invention is not limited to this embodiment. Rather, the invention may be used with other types of lengths of pipe 1, 2 and in structures 3 which are not necessarily buildings. Furthermore, depending on the desired use and installation, it is also understood that the anchoring clamp 30 may be assembled about the external peripheral groove 20 either before or after the first and second pipe lengths 1, 2 have been received in the first and second openings 11, 12 respectively. In one preferred embodiment, the anchoring clamp 30 is assembled about the external peripheral groove 20 after one of the first or second openings 21, 22 has received one of the first length of pipe 1 or second length of pipe 2, respectively.

While the external peripheral groove 20 has been shown as being substantially cylindrical, it is understood that this is a preferred embodiment and that this surface contour of the outer surface of the external peripheral groove 20 may be modified in any manner to obtain a proper preferred mating of the inner surface of the anchoring clamp 30 and the outer surface of the external peripheral groove 20. For instance, dimples and/or indentations could be used to improve mating of the inner surface of the anchoring clamp 30 to the outer surface of the external peripheral groove 20. Alternatively, the external peripheral groove may optionally have a polygonal outer surface with a plurality of flat sides (not shown) which would mate with corresponding flat sides (not shown) on the inner surface of the anchoring clamp.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

The embodiments of the invention in which an exclusive property or privilege is claimed are defined as follows:

1. A coupling and anchoring system for fluidly coupling a first length of pipe to a second length of pipe and anchoring the lengths of pipe to a structure, said coupling and anchoring system comprising:

a pipe coupling extending along a coupling longitudinal axis and having a first pipe opening for receiving the first length of pipe along the coupling longitudinal axis and a second pipe opening for receiving the second length of pipe, said pipe coupling having an external peripheral groove located axially intermediate the first pipe opening and the second pipe opening, said external peripheral groove defined by a first axial clamp engaging surface which axially faces a second axial clamp engaging surface with the external peripheral groove formed therebetween;

an anchoring clamp for fastening to the structure, said anchoring clamp having a first axial coupling engaging surface which is axially opposed from a second axial coupling engaging surface, wherein the anchoring clamp is axially sized to be received by the external peripheral groove with the first axial coupling engaging surface of the anchoring clamp engaging the first axial clamp engaging surface of the pipe coupling, and the second axial coupling engaging surface of the anchoring clamp engaging the second axial clamp engaging surface of the pipe coupling to restrict axial movement of the pipe coupling when the anchoring clamp is fastened to the structure; and wherein the first pipe opening and the second pipe opening are sized to receive the first and second pipe lengths, respectively, and wherein the first pipe opening has, at a first pipe stop axial position, a first radial pipe stop extending radially inwardly from a first side wall of the first opening for abutting contact with a longitudinal end of the first length of pipe to prevent further insertion of the first length of pipe into the first opening, and, the second pipe opening has, at a second pipe stop axial position, a second radial pipe stop extending radially inwardly from a second side wall of the second opening for abutting contact with a longitudinal end of the second length of pipe to prevent further insertion of the second length of pipe into the second opening; and wherein the external peripheral groove is located axially interposed between the first and second pipe stop axial positions and axially interposed between the first and second axial clamp engaging surface.

2. The coupling and anchoring system as defined in claim 1, wherein the anchoring clamp is formed of two or more arced bands, each arced band having a central arc portion interposed between laterally extending connecting portions, said laterally extending connecting portions overlapping with laterally extending connecting portions of adjacent arced bands to connect adjacent arced bands together and assemble the anchoring clamp about the external peripheral groove with each central arc portion forming an arc segment of the anchoring clamp when the anchoring clamp is assembled about the external peripheral groove;

wherein each of said arc bands has a radially inner side comprising an inner concave surface of the corresponding center arc portions.

3. The coupling and anchoring system as defined in claim 2, wherein the two or more adjacent arced bands comprise two substantially identical arced bands with the central arc portion forming about 180° of the arc segment of the anchoring clamp and said laterally extending connecting portions extending laterally from opposed ends of the central arc portion for connecting the two substantially identical arced bands about the external peripheral groove of the pipe coupling.

4. The coupling and anchoring system as defined in claim 3, wherein assembly of the anchoring clamp about the external peripheral groove by connecting the overlapping laterally extending connecting portions combines the central arced portions to define an internal clamp diameter of the anchoring clamp, said internal clamp diameter being comparable to an outer diameter of the external peripheral groove of the pipe coupling, wherein the laterally extending connecting portions extend laterally from the central arc portion and are radially separated from the internal diameter of the anchoring clamp such that the internal clamp diameter is unaffected by compression connecting forces applied to overlapping lateral extending connecting portions.

5. The coupling and anchoring system as defined in claim 2, wherein each of the arced bands further comprise at least one laterally extending arc element having an inner concave element surface on the radially inner side of said arced band and extending laterally from one of the laterally extending connecting portions;

wherein when the adjacent arced bands are connected to assemble the anchor clamp about the exterior peripheral groove, the inner concave element surfaces of at least two of the laterally extending arc element face each other to form at least one axial channel which is parallel to the coupling longitudinal axis and defines an axial opening for axially receiving a fastening mechanism in a longitudinal direction parallel to the coupling longitudinal axis to fasten the anchoring clamp to a perpendicular portion of the structure perpendicular to the coupling longitudinal axis.

6. The coupling and anchoring system as defined in claim 5 wherein the two or more adjacent arced bands comprise two substantially identical arced bands with the central arc portion forming about 180° of the arc segment of the anchoring clamp and said laterally extending connecting portions extend laterally from opposed ends of the central arc portion for connecting the two substantially identical arced bands about the external peripheral groove of the pipe coupling; and wherein each of the two substantially identical arced bands further comprise two laterally extending arc elements, each of the laterally extending arc elements having their inner concave element surface on the radially inner side of said arced band and each laterally extending arc element extending laterally from a corresponding one of the laterally extending connecting portions;

wherein when the adjacent arced bands are connected to assemble the anchoring clamp about the exterior peripheral groove, each of the laterally extending arc elements face a corresponding laterally extending arc element of the adjacent arc band to form two axial channels each parallel to the coupling longitudinal axis and diametrically opposed on the anchoring clamp, with each axial channel defining a corresponding axial opening for axially receiving the fastening mechanism, in the longitudinal direction parallel to the coupling longitudinal axis to fasten the anchoring clamp to the perpendicular portion of the structure perpendicular to the coupling longitudinal axis.

7. The coupling and anchoring system as defined in claim 6, wherein each of the laterally extending connecting portions further comprise at least one perpendicular fastener receiving opening arranged perpendicular to the coupling longitudinal axis and arranged to align with corresponding perpendicular fastener receiving openings of overlapping laterally extending connecting portions of adjacent arc bands during assembly of the anchoring clamp about the peripheral groove, said perpendicular fastener receiving openings sized to receive fasteners for applying compression connection forces to connect the adjacent arced bands and assemble the anchoring clamp about the peripheral groove.

8. The coupling and anchoring system as defined in claim 7, wherein the perpendicular fastener receiving openings of the laterally extending connecting portions may receive the fastening mechanism therethrough to both connect the adjacent arced bands together for assembling the anchoring clamp about the peripheral groove and fasten the anchoring clamp to a parallel portion of the structure parallel to the coupling longitudinal axis;

wherein the axial openings defined by the axial channels and the perpendicular fastener receiving openings in the lateral extending connecting portions form dual fastening openings for receiving the fastening mechanism perpendicular to the coupling longitudinal axis or parallel to the coupling longitudinal axis, to anchor the anchoring clamp to the parallel portion of the structure or the perpendicular portion of the structure.

9. The coupling and anchoring system as defined in claim 8, wherein each arced band is manufactured from a strip of metal with the central arc portion interposed between the laterally extending connection portions and the laterally extending arc elements formed by bending the strip of metal and the pipe coupling is manufactured from plastic.

10. The coupling and anchoring system as defined in claim 9, wherein the strips of metal used to form the arced bands have a band thickness along first and second transverse surfaces comparable to a groove depth of the external peripheral groove;

wherein the strips of metal used to form the arced bands have a band width across the radially inner side comparable to a groove width of the external peripheral groove between the axially facing first and second axial clamp engaging surfaces;

wherein when the arced bands are connected to assemble the anchoring clamp about the external peripheral groove, the first and second axial coupling engaging surfaces of the anchoring clamp are substantiality perpendicular to the inner concave surface of each of the arc bands assembled to form the anchoring clamp, and the anchoring clamp is axially sized to be received axially within the external peripheral groove with the first transverse surface forming the first axial coupling engaging surface of the anchoring clamp engaging the first axial clamp engaging surface of the pipe coupling, and the second transverse surface forming the second axial coupling engaging surface of the anchoring clamp engaging the second axial clamp engaging surface of the pipe coupling to restrict axial movement of the pipe coupling when the anchoring clamp is fastened to the structure.

11. The coupling and anchoring system as defined in claim 10 wherein the pipe coupling has a coupling external circumference extending radially about the coupling longitudinal axis and the external peripheral groove extends radially about the coupling external circumference.

12. The coupling and anchoring system as defined in claim 11 wherein the first axial clamp engaging surface and the second axial clamp engaging surface extend radially about the coupling external circumference forming the external peripheral groove therebetween.

13. The coupling and anchoring system as defined in claim 1 wherein the first pipe length has a first internal pipe diameter, and, wherein the pipe coupling comprises an internal fluid passageway between the first and second pipe stop axial locations, said internal fluid passageway having an inner passageway diameter consistent with the first inner pipe diameter giving the pipe coupling a substantially hourglass cross section.

14. A kit for fluidly coupling a first length of pipe to a second length of pipe and anchoring the lengths of pipe to a structure, the kit comprising:
 a pipe coupling extending along a coupling longitudinal axis and having a first pipe opening for receiving the first length of pipe along the coupling longitudinal axis and a second pipe opening for receiving the second length of pipe, said pipe coupling having an external peripheral groove located axially intermediate the first pipe opening and the second pipe opening, said external peripheral groove defined by a first axial clamp engaging surface which axially faces a second axial clamp engaging surface with the external peripheral groove formed therebetween;
 an anchoring clamp assembly comprising:
 two or more arced bands, each arced band having a central arc portion interposed between laterally extending connecting portions, said laterally extending connecting portions overlapping with laterally extending connecting portions of adjacent arced bands to connect adjacent arced bands together to assemble the anchoring clamp about the external peripheral groove of the pipe coupling wherein each central arc portion forming an arc segment of the anchoring clamp when the anchoring clamp is assembled about the external peripheral groove;
 wherein assembly of the anchoring clamp in the external peripheral groove provides a first axial coupling engaging surface of the anchoring clamp which is axially opposed from a second axial coupling engaging surface, wherein the anchoring clamp so assembled is axially sized to be received by the external peripheral groove with the first axial coupling engaging surface of the anchoring clamp engaging the first axial clamp engaging surface of the pipe coupling, and the second axial coupling engaging surface of the anchoring clamp engaging the second axial clamp engaging surface of the pipe coupling to restrict axial movement of the pipe coupling when the anchoring clamp is fastened to the structure; and
 wherein the first pipe opening and the second pipe opening are sized to receive the first and second pipe lengths, respectively, and wherein the first pipe opening has, at a first pipe stop axial position, a first radial pipe stop extending radially inwardly from a first side wall of the first opening for abutting contact with a longitudinal end of the first length of pipe to prevent further insertion of the first length of pipe into the first opening, and, the second pipe opening has, at a second pipe stop axial position, a second radial pipe stop extending radially inwardly from a second side wall of the second opening for abutting contact with a longitudinal end of the second length of pipe to prevent further insertion of the second length of pipe into the second opening; and
 wherein the external peripheral groove is located axially interposed between the first and second pipe stop axial positions and axially interposed between the first and second axial clamp engaging surface.

15. The kit as defined in claim 14, wherein each of said arced bands has a radially inner side comprising an inner concave surface of the corresponding center arc portions; and
 wherein each of the bands further comprise at least one laterally extending arc element having an inner concave element surface on the radially inner side of said arced band and extending laterally from one of the laterally extending connecting portions;
 wherein when the adjacent arced bands are connected to assemble the anchoring clamp about the exterior peripheral groove, the inner concave element surfaces of at least two of the laterally extending arc elements face each other to form at least one axial channel which is parallel to the coupling longitudinal axis and define an axial opening for axially receiving fastening mechanisms in a longitudinal direction parallel to the coupling longitudinal axis to fasten the anchoring clamp to a perpendicular portion of the structure perpendicular to the coupling longitudinal axis.

16. The kit as defined in claim 15 wherein the two or more adjacent arced bands comprise two substantially identical arced bands with the central arc portion forming about 180° of the arc segment of the anchoring clamp and said laterally extending connecting portions extend laterally from opposed ends of the central arc portion for connecting the two substantially identical arced bands about the external peripheral groove of the pipe coupling; and
 wherein each of the two substantially identical arced bands further comprise two laterally extending arc elements, each of the laterally extending arc elements having their inner concave element surface on the radially inner side of said arced band and each laterally extending arc element extending laterally from a corresponding one of the laterally extending connecting portions;

wherein when the adjacent arced bands are connected to assemble the anchoring clamp about the exterior peripheral groove, each of the laterally extending arc elements face a corresponding laterally extending arc element of the adjacent arc band to form two axial channels each parallel to the coupling longitudinal axis and diametrically opposed on the assembled anchoring clamp, with each axial channel defining a corresponding axial opening configured to axially receive corresponding fastening mechanisms in the longitudinal direction parallel to the coupling longitudinal axis to fasten the anchoring clamp to the perpendicular portion of the structure perpendicular to the coupling longitudinal axis.

17. The kit as defined in claim 16, wherein each of the laterally extending connecting portions further comprise at least one perpendicular fastener receiving opening arranged perpendicular to the coupling longitudinal axis and arranged to align with corresponding perpendicular fastener receiving openings of overlapping laterally extending connecting portions of adjacent arc bands during assembly of the anchoring clamp about the peripheral groove, said perpendicular fastener receiving openings sized to receive fasteners for applying compression connection forces to connect the adjacent arc bands and assemble the anchoring clamp about the peripheral groove.

18. The kit as defined in claim 17 wherein the perpendicular fastener receiving openings of the laterally extending connecting portions may receive the fastening mechanism therethrough to both connect the adjacent arced bands together for assembling the anchoring clamp about the peripheral groove and fasten the anchoring clamp to a parallel portion of the structure parallel to the coupling longitudinal axis;

wherein the axial openings defined by the axial channels and the perpendicular fastener receiving openings in the lateral extending connecting portions form dual fastening openings for receiving the fastening mechanisms, either perpendicular to the coupling longitudinal axis or parallel to the coupling longitudinal axis, to anchor the anchoring clamp to the parallel portion of the structure or the perpendicular portion of the structure.

19. The kit as defined in claim 16, wherein, assembly of the anchoring clamp about the external peripheral groove by connecting the overlapping laterally extending connecting portions combines the central arced portions to define an internal clamp diameter of the anchoring clamp, said internal clamp diameter being comparable to an outer diameter of the external peripheral groove of the pipe coupling, wherein the laterally extending connecting portions extend laterally from the central arc portion and are radially separated from the internal diameter of the anchor clamp such that the internal clamp diameter is unaffected by compression connecting forces applied to overlapping lateral extending connecting portions.

20. A kit for fluidly coupling a first length of pipe to a second length of pipe and anchoring the lengths of pipe to a structure, the kit comprising:

a pipe coupling extending along a coupling longitudinal axis and having a first pipe opening for receiving the first length of pipe along the coupling longitudinal axis and a second pipe opening for receiving the second length of pipe, said pipe coupling having an external peripheral groove located axially intermediate the first pipe opening and the second pipe opening, said external peripheral groove defined by a first axial clamp engaging surface which axially faces a second axial clamp engaging surface with the external peripheral groove formed therebetween;

an anchoring clamp assembly comprising:

two or more arced bands, each arced band having a central arc portion interposed between laterally extending connecting portions, said laterally extending connecting portions overlapping with laterally extending connecting portions of adjacent arced bands to connect adjacent arced bands together to assemble the anchoring clamp about the external peripheral groove of the pipe coupling wherein each central arc portion forming an arc segment of the anchoring clamp when the anchoring clamp is assembled about the external peripheral groove;

wherein assembly of the anchoring clamp in the external peripheral groove provides a first axial coupling engaging surface of the anchoring clamp which is axially opposed from a second axial coupling engaging surface, wherein the anchoring clamp so assembled is axially sized to be received by the external peripheral groove with the first axial coupling engaging surface of the anchoring clamp engaging the first axial clamp engaging surface of the pipe coupling, and the second axial coupling engaging surface of the anchoring clamp engaging the second axial clamp engaging surface of the pipe coupling to restrict axial movement of the pipe coupling when the anchoring clamp is fastened to the structure; and wherein the first and second lengths of pipe form part of a pipe riser in a building, and the structure is a part of the building; and wherein the anchoring clamp is assembled about the external peripheral groove after one of the first or second openings has received one of the first length of pipe or second length of pipe, respectively.

21. The kit as defined in claim 20, wherein each of said arced bands has a radially inner side comprising an inner concave surface of the corresponding center arc portions; and wherein each of the bands further comprise at least one laterally extending arc element having an inner concave element surface on the radially inner side of said arced band and extending laterally from one of the laterally extending connecting portions;

wherein when the adjacent arced bands are connected to assemble the anchoring clamp about the exterior peripheral groove, the inner concave element surfaces of at least two of the laterally extending arc elements face each other to form at least one axial channel which is parallel to the coupling longitudinal axis and define an axial opening for axially receiving fastening mechanisms in a longitudinal direction parallel to the coupling longitudinal axis to fasten the anchoring clamp to a perpendicular portion of the structure perpendicular to the coupling longitudinal axis.

22. The kit as defined in claim 21 wherein the two or more adjacent arced bands comprise two substantially identical arced bands with the central arc portion forming about 180° of the arc segment of the anchoring clamp and said laterally extending connecting portions extend laterally from opposed ends of the central arc portion for connecting the two substantially identical arced bands about the external peripheral groove of the pipe coupling; and
   wherein each of the two substantially identical arced bands further comprise two laterally extending arc elements, each of the laterally extending arc elements having their inner concave element surface on the radially inner side of said arced band and each laterally extending arc element extending laterally from a corresponding one of the laterally extending connecting portions;
   wherein when the adjacent arced bands are connected to assemble the anchoring clamp about the exterior peripheral groove, each of the laterally extending arc elements face a corresponding laterally extending arc element of the adjacent arc band to form two axial channels each parallel to the coupling longitudinal axis and diametrically opposed on the assembled anchoring clamp, with each axial channel defining a corresponding axial opening configured to axially receive corresponding fastening mechanisms in the longitudinal direction parallel to the coupling longitudinal axis to fasten the anchoring clamp to the perpendicular portion of the structure perpendicular to the coupling longitudinal axis.

23. The kit as defined in claim 22, wherein each of the laterally extending connecting portions further comprise at least one perpendicular fastener receiving opening arranged perpendicular to the coupling longitudinal axis and arranged to align with corresponding perpendicular fastener receiving openings of overlapping laterally extending connecting portions of adjacent arc bands during assembly of the anchoring clamp about the peripheral groove, said perpendicular fastener receiving openings sized to receive fasteners for applying compression connection forces to connect the adjacent arc bands and assemble the anchoring clamp about the peripheral groove.

24. The kit as defined in claim 23 wherein the perpendicular fastener receiving openings of the laterally extending connecting portions may receive the fastening mechanism therethrough to both connect the adjacent arced bands together for assembling the anchoring clamp about the peripheral groove and fasten the anchoring clamp to a parallel portion of the structure parallel to the coupling longitudinal axis;
   wherein the axial openings defined by the axial channels and the perpendicular fastener receiving openings in the lateral extending connecting portions form dual fastening openings for receiving the fastening mechanisms, either perpendicular to the coupling longitudinal axis or parallel to the coupling longitudinal axis, to anchor the anchoring clamp to the parallel portion of the structure or the perpendicular portion of the structure.

25. The kit as defined in claim 22 wherein, assembly of the anchoring clamp about the external peripheral groove by connecting the overlapping laterally extending connecting portions combines the central arced portions to define an internal clamp diameter of the anchoring clamp, said internal clamp diameter being comparable to an outer diameter of the external peripheral groove of the pipe coupling,
   wherein the laterally extending connecting portions extend laterally from the central arc portion and are radially separated from the internal diameter of the anchor clamp such that the internal clamp diameter is unaffected by compression connecting forces applied to overlapping lateral extending connecting portions.

26. The kit as defined in claim 20 wherein the first pipe opening and the second pipe opening are sized to receive the first and second pipe lengths, respectively, and wherein the first pipe opening has, at a first pipe stop axial position, a first radial pipe stop extending radially inwardly from a first side wall of the first opening for abutting contact with a longitudinal end of the first length of pipe to prevent further insertion of the first length of pipe into the first opening, and, the second pipe opening has, at a second pipe stop axial position, a second radial pipe stop extending radially inwardly from a second side wall of the second opening for abutting contact with a longitudinal end of the second length of pipe to prevent further insertion of the second length of pipe into the second opening; and
   wherein the external peripheral groove is located axially interposed between the first and second pipe stop axial positions and axially interposed between the first and second axial clamp engaging surface.

\* \* \* \* \*